United States Patent
Izumi

[11] Patent Number: 5,742,371
[45] Date of Patent: Apr. 21, 1998

[54] LCD WITH AN ELECTRIC WIRING HAVING A LINE WIDTH NARROWER IN AN AREA WHERE A SEAL CROSS THE WIRING THAN WHERE THE SEAL DOES NOT CROSS

[75] Inventor: Yoshihiro Izumi, Kashihara, Japan

[73] Assignee: Sharp Kabushiki Kaisha, Osaka, Japan

[21] Appl. No.: 818,184

[22] Filed: Mar. 14, 1997

Related U.S. Application Data

[62] Division of Ser. No. 555,830, Nov. 13, 1995, Pat. No. 5,654,781.

[30] Foreign Application Priority Data

Dec. 15, 1994 [JP] Japan ................... 6-312157
Dec. 15, 1994 [JP] Japan ................... 6-312160
Sep. 14, 1995 [JP] Japan ................... 7-237446

[51] Int. Cl.$^6$ .................... G02F 1/1333; G02F 1/1343; G02F 1/1339
[52] U.S. Cl. .................... 349/139; 349/73; 349/153
[58] Field of Search .................... 349/139, 153, 349/73

[56] References Cited

U.S. PATENT DOCUMENTS

| | | | |
|---|---|---|---|
| 4,408,836 | 10/1983 | Kikuno | 349/73 |
| 4,832,457 | 5/1989 | Saitoh et al. | 349/73 |
| 5,106,197 | 4/1992 | Ohuchida et al. | 349/73 |
| 5,148,301 | 9/1992 | Sawatsubashi et al. | 349/153 |
| 5,164,863 | 11/1992 | Shimazaki | 349/73 |
| 5,276,541 | 1/1994 | Terada et al. | 349/153 |
| 5,335,103 | 8/1994 | Kim | 349/153 |
| 5,386,309 | 1/1995 | Nam | 349/139 |
| 5,396,356 | 3/1995 | Fukuchi | 349/153 |
| 5,410,423 | 4/1995 | Fursushima et al. | 349/153 |
| 5,519,524 | 5/1996 | Fergason et al. | 349/153 |

FOREIGN PATENT DOCUMENTS

| | | |
|---|---|---|
| 62-8771 | 2/1987 | Japan . |
| 1-213621 | of 1989 | Japan . |
| 5-19346 | 1/1993 | Japan . |
| 5-19347 | 1/1993 | Japan . |
| 5-127605 | 5/1993 | Japan . |
| 5-188340 | 7/1993 | Japan . |
| 5-341310 | 12/1993 | Japan . |
| 6-17178 | 2/1994 | Japan . |

Primary Examiner—William L. Sikes
Assistant Examiner—Toan Ton
Attorney, Agent, or Firm—Nixon & Vanderhye P.C.

[57] ABSTRACT

A liquid crystal display panel has an electric wiring provided at least on one of a pair of substrates, a seal member, applied to the substrate so as to partially cross the electric wiring, the seal member being made of a ultraviolet ray hardening resin or a ultraviolet ray hardening resin used in combination with heat hardening, wherein the electric wiring has a line width narrower in an area where the seal member crosses the electric wiring than in an area where the seal member does not cross the electric wiring. With the arrangement, when the ultraviolet ray is externally projected onto the seal member from the substrate side, the substrate being provided with the electric wiring, the ultraviolet ray can be fully projected even onto the seal member on the electric wiring which has a narrow line width. It is thus avoided that the liquid crystal orientation is disturbed due to the inadequate hardening of the seal member and the inadequate filling of the liquid crystal occurs. Since the fine line seal member is accurately provided in the vicinity of the pixel, when the liquid crystal display apparatus is made by connecting a plurality of such liquid crystal display panels, it is possible to provide the liquid crystal display apparatus in which the connecting part is not noticeable and the displaying quality is excellent.

9 Claims, 13 Drawing Sheets

LCD WITH AN ELECTRIC WIRING HAVING A LINE WIDTH NARROWER IN AN AREA WHERE A SEAL CROSS THE WIRING THAN WHERE THE SEAL DOES NOT CROSS

RELATED APPLICATIONS

This is a divisional of my commonly assigned U.S. application Ser. No. 08/555,830, filed Nov. 13, 1995, now U.S. Pat. No. 5,654,781. It is also related to my concurrently herewith filed copending commonly assigned further divisional applications Ser. No. 08/818,341, (Atty Dkt. 1035-124) and Ser. No. 08/818,752, (Atty Dkt. 1035-125).

FIELD OF THE INVENTION

The present invention relates to a direct viewing liquid crystal display apparatus for use in AV (Audio Visual) devices, OA (Office Automation) equipments, or electronic equipments such as note-type personal computer and relates to a liquid crystal display panel for use in such a direct viewing liquid crystal display apparatus.

BACKGROUND OF THE INVENTION

Recently, a domestic television set used as the AV device and a display device for use in the OA equipments have been required to have the characteristics such as compactness, thinness, low electric power dissipation, high resolution, and scope enlargement. Thus, the development and practicability have been promoted in the scope enlargement of display devices such as CRTs, liquid crystal displays (LCDs), plasma display devices (PDPs), electro-luminescence display devices, and light emitting diodes (LEDs).

Above all, the liquid crystal display apparatus has the following advantages compared to other display devices: (1) the thickness (depth) can be much thinner, (2) the electric power dissipation can be lower, (3) the full color display can be made easier, and the like. For the reasons, the liquid crystal display apparatus has been recently adopted in many technical fields. It is greatly hoped that the scope enlargement is made.

However, such a scope enlargement results in that the proportion defective, due to the facts such as the burnout of signal lines during the manufacturing process and the defect of pixel, remarkably becomes great, thereby presenting the problem that the price of the liquid crystal display apparatus rises. In order to solve such problems, a single liquid crystal display apparatus is made by connecting with each other a plurality of liquid crystal display panels, so that the scope enlargement is made.

FIG. 15 shows one example of such a liquid crystal display apparatus which is made by connecting with each other a plurality of liquid crystal display panels so as to realize the scope enlargement. In FIG. 15, two liquid crystal display panels 101 and 102 are connected with each other. Each one of the liquid crystal display panels 101 and 102 is provided with two substrates. During the manufacturing process of each one of the liquid crystal display panels 101 and 102, after the two substrates are connected with each other by a seal member 112, the liquid crystal is filled between the two substrates through an opening (filler hole) 113. The seal member 112 is applied for its formation to the peripheral part of the substrate in accordance with the screen printing or the dispenser drawing.

Pixels 106 are provided in a matrix form in the respective liquid crystal display panels 101 and 102. Each pixel 106 is provided with three pixel electrodes 105 which respectively correspond to R (red), G (green), and B (blue) color filters for the color display.

The pixels 106 is driven by TFTs (thin film transistors) 108 which are connected with the respective pixel electrodes 105 (see FIG. 14). The TFT 108 is connected with a scanning electrode 109 and a signal electrode 110 so that each pixel electrode 105 is independently driven. The scanning electrode 109 and the signal electrode 110 are electrically isolated by an isolation film 111.

In the case of a liquid crystal display panel of so-called Cs on Gate structure in which the driving is carried out in accordance with an auxiliary capacitance (Cs) of addition capacitance type which is obtained by overlapping the pixel electrode 105 of one pixel 106 and the scanning electrode 109 of the other pixel 106, the scanning electrode 109 is extended outside the seal member 112 so that the burning test can be made during the manufacturing process of the liquid crystal display panel (see FIG. 14). Note that FIG. 14 shows the structure having no Cs for convenience sake, not the Cs on Gate structure. The seal member 112 is applied to the substrate after the formation of the electric wirings such as the scanning electrodes 109 and the signal electrodes 110, so that the seal member 112 crosses the scanning electrodes 109 at crossing part 109a in a plane manner.

For the liquid crystal display apparatus which is made by connecting with each other a plurality of liquid crystal display panels, it is required to improve the displaying quality based on the fact that the part where the liquid crystal panels are connected with each other is noticeable as less as possible. Thus, it is required that the seal member 112 be provided, around the connecting part of the liquid crystal display panels, so as to be close to the pixel 106 (see FIG. 14). In order that the area where the seal member 112 occupies in the connecting part of the liquid crystal display panels becomes as small as possible, it is required that the seal member 112 is formed in accordance with a very fine pattern around the connecting part of the liquid crystal display panels.

According to the conventional arts, the thermosetting resin is generally used as the seal member. When the thermosetting resin is used as the seal member, it sometimes occurs that the seal shape during the temperature rise is disturbed or the residual solvent exudes. Such occurence is likely to cause the disturbance of the liquid crystal orientation in the range of several hundreds of microns around the seal member. Accordingly, it is not possible to dispose the seal pattern around the pixel. Thus, since it is required that the seal pattern is provided away from the pixel, in the case where the liquid crystal display apparauts is made by connecting with each other a plurality of liquid crystal display panels, the area, where the seal member 112 occupies in the connecting part of the liquid crystal display panels, becomes great. Thus, the connecting part becomes noticeable, thereby causing to deteriorate the displaying quality. For the foregoing reason, the ultraviolet ray hardening resin or the ultraviolet ray hardening resin used in combination with the heat hardening has been used as the seal member.

However, in the case where the ultraviolet ray hardening resin or the ultraviolet ray hardening resin used in combination with the heat hardening is used as the seal member, when the seal pattern is not fine, the area, where the seal member occupies in the connecting part of the liquid crystal display panels, becomes great. Thus, the connecting part becomes noticeable. Accordingly, it is required, around the connecting part of the liquid crystal display panels, that the seal member be formed in accordance with a very fine pattern in the vicinity of the pixel.

The method, wherein the ultraviolet ray hardening resin or the ultraviolet ray hardening resin used in combination with the heat hardening has been used as the seal member of the liquid crystal display panel, has been adopted for the manufacture of small liquid crystal display panels of 1–2 inch-type. In such small liquid crystal display panels, (1) the pixel electrodes and the electric wiring are extremely small and (2) it is required to connect the panel substrates with each other with high accuracy. Accordingly, it is preferable to use the ultraviolet ray hardening resin or the ultraviolet ray hardening resin used in combination with the heat hardening which has little misregistration during hardening of the seal member.

In case of 1–2 inch-type small liquid crystal display panels, when projecting the ultraviolet ray from the ultraviolet ray lamp onto the seal member made of the ultraviolet ray hardening resin or the ultraviolet ray hardening resin used in combination with the heat hardening so as to harden the seal member, the seal member can be accurately hardened in a short time. Since the electric wiring provided in the liquid crystal display panel has a very fine line width of not more than 20 microns, the ultraviolet ray is fully projected even to the seal member on the electric wiring, so that the seal member can be quickly hardened.

In contrast, in case of a single liquid crystal display apparatus made by connecting with each other a plurality of liquid crystal display panels for the scope enlargement, a seal member 6 is provided beneath a black matrix 5 (see FIG. 2 illustrating the present invention) so that the connecting part of the liquid crystal display panels is not noticeable. Such arrangement makes it impossible that the ultraviolet ray is externally projected to the seal member 6 from a substrate side, the substrate being provided with the black matrix 5. Accordingly, the ultraviolet ray must be externally projected to the seal member 6 from the opposite substrate side, the substrate being provided with a TFT.

For the large liquid crystal display panel, it is required to broaden the line width of the electric wiring so as to reduce the time delay of the signal during its propagation. More specifically, in such a case, it is required to provide the electric wiring so that the line width is not less than 20 microns. (1) In case of the liquid crystal display apparatus having a scope of 30-inch or (2) in the case where the electric wiring combines an electrode causing to generate the auxiliary capacitance, it is required to provide the electric wiring so that the line width becomes about 100 microns.

When the line width of the electric wiring is thus broadly provided (about 100 microns) in the liquid crystal display panel, even if the ultraviolet ray from the ultraviolet ray lamp is projected onto the seal member 112 made of the ultraviolet ray hardening resin or the ultraviolet ray hardening resin used in combination with the heat hardening, it is impossible to fully project the ultraviolet ray onto the electric wiring, i.e., onto the seal member 112 on the crossing part 109a of the scanning electrode 109 (see FIG. 14). Thus, it is likely that the inadequate hardening of the seal member 112 occurs. Further, the problem is presented that (1) when the liquid crystal is filled through the opening 113 between the two substrates under vacuum, the liquid crystal is not fully filled since a predetermined vacuum level is not kept inside the liquid crystal cell due to such an inadequate hardening of the seal member 112, or (2) the liquid crystal orientation in the vicinity of the seal member 112 is disturbed.

In the case where the electric wiring has such a broad line width, even the seal member on the electric wiring may be hardened to a degree by projecting the ultraviolet ray for a long time. However, in such a case, the liquid crystal display panel absorbs the ultraviolet ray and is thus heated up, thereby causing the occurrence of the distortion.

According to the foregoing conventional liquid crystal display apparauts made by connecting with each other a plurality of liquid crystal display panels, when the seal member is provided in the vicinity of the pixel so that the connecting part is not noticeable, it is likely that (1) the liquid crystal orientation was disturbed due to the inadequate hardening of the seal member and (2) the inadequate filling of the liquid crystal occurred. Thus, it has been impossible to accurately provide the fine line seal member in the vicinity of the pixel.

Even in the liquid crystal display apparatus having a single liquid crystal display panel, it is sometimes required that the seal member be provided in the vicinity of the pixel during the manufacturing process of the liquid crystal display panel. More specifically, it is recently required to enlarge the display area in the liquid crystal display apparatus having a predetermined dimension as is often seen in a liquid crystal module, having a limited casing, for use in a note-type personal computer. Since the maximum module dimension of the liquid crystal display panel which can be accommodated in the note-type personal computer having a predetermined outline is almost determined, it is required to broaden a bit further the display area of the liquid crystal display panels within the limited module outline. The broadening of the pixel area of the liquid crystal display panel necessitates that the seal member be provided in the vicinity of the pixel during the manufacturing process of the liquid crystal display panel.

However, in such a case, like the foregoing liquid crystal display apparatus made by connecting a plurality of liquid crystal display panels, it is most likely that the inadequate hardening of the seal member occurs in the area where the seal member crosses the electric wiring such as the scanning electrodes or the signal electrodes. In addition, in the area where the seal member crosses the electric wiring, it is most likely that the seal member is seeped out or the pattern of the seal member is disturbed (later described). Such seeping of the seal member and disturbance of the pattern of the seal member causes the seal member to erode the pixel area, thereby resulting in that the displaying quality of the liquid crystal display apparatus is deteriorated.

As mentioned above, in the liquid crystal display apparatus having a single liquid crystal display panel, when the seal member is provided in the vicinity of the pixel so as to broaden the display area, it was observed that the inadequate hardening of the seal member occured, the seal member was seeped out, and the pattern of the seal member was disturbed. Thus, it was impossible to accurately provide the seal member in the vicinity of the pixel.

SUMMARY OF THE INVENTION

The present invention is made in light of the foregoing problems. It is an object of the present invention to provide a liquid crystal display apparatus, made by connecting with each other a plurality of liquid crystal display panels, in which a fine line seal member is accurately provided in the vicinity of pixels so that the connecting parts of the liquid crystal display panels are not noticeable and the displaying quality is excellent.

It is another object of the present invention to provide a liquid crystal display apparatus, made by a single liquid crystal display panel, in which a seal member is accurately provided in the vicinity of pixels so as to broaden the display area.

In order to achieve the foregoing object, a liquid crystal display panel of the present invention is provided with a pair of substrates, an electric wiring provided at least on one of the substrates, a seal member, applied to the substrate so as to partially cross the electric wiring, for combining the pair of substrates so that liquid crystal is filled between the pair of substrates, the seal member being made of a ultraviolet ray hardening resin or a ultraviolet ray hardening resin used in combination with heat hardening, wherein the electric wiring has a line width which is narrower in an area where the seal member crosses the electric wiring than in an area where the seal member does not cross the electric wiring.

According to the foregoing liquid crystal display panel, when the ultraviolet ray is externally projected onto the seal member from the substrate side, the substrate being provided with the electric wiring, the ultraviolet ray can be fully projected even onto the seal member on the electric wiring which has a narrow line width. Thus, it is avoidable that the inadequate hardening of the seal member occurs in the area where the seal member crosses the electric wiring, thereby resulting in that the seal member of the combined substrates is fully hardened.

It is thus avoided that the liquid crystal orientation is disturbed due to the inadequate hardening of the seal member and the inadequate filling of the liquid crystal occurs. Accordingly, it can be avoided that the seal member affects the pixel, thereby resulting in that the fine line seal member is accurately provided in the vicinity of the pixel.

When the liquid crystal display apparatus is made by connecting a plurality of such liquid crystal display panels, it is possible to provide the liquid crystal display apparatus in which the connecting part is not noticeable and the displaying quality is excellent.

In order to achieve the foregoing object, another liquid crystal display panel of the present invention is provided with a pair of substrates, an electric wiring provided at least on one of the substrates, a seal member, applied to the substrate so as to partially cross the electric wiring, for combining the pair of substrates so that liquid crystal is filled between the pair of substrates, the seal member being made of a ultraviolet ray hardening resin or a ultraviolet ray hardening resin used in combination with heat hardening, wherein the area where the seal member crosses the electric wiring has an opening.

According to the foregoing liquid crystal display panel, when the ultraviolet ray is externally projected onto the seal member from the substrate side, the substrate being provided with the electric wiring, the ultraviolet ray can be fully projected even onto the seal member on the electric wiring. Thus, it is avoidable that the inadequate hardening of the seal member occurs in the area where the seal member crosses the electric wiring, thereby resulting in that the fine line seal member can be accurately provided in the vicinity of the pixel.

When the foregoing liquid crystal panel is used in the liquid crystal display apparatus in which a plurality of liquid crystal display panels are connected with each other, it is possible to provide the liquid crystal display apparatus in which the connecting part is not noticeable and the displaying quality is excellent.

In order to achieve the foregoing object, a still another liquid crystal display panel of the present invention is provided with a pair of substrates, an electric wiring provided at least on one of the substrates, a seal member, applied to the substrate so as to partially cross the electric wiring, for combining the pair of substrates so that liquid crystal is filled between the pair of substrates, the seal member being made of a ultraviolet ray hardening resin or a ultraviolet ray hardening resin used in combination with heat hardening, wherein the area where the seal member crosses the electric wiring is made of a transparent electrode which the ultraviolet ray can transmit.

According to the foregoing liquid crystal display panel, when the ultraviolet ray is externally projected onto the seal member from the substrate side, the substrate being provided with the electric wiring, the ultraviolet ray can be more projected even onto the seal member on the transparent electrode compared to the case where the electric wiring is finely provided. Since the seal member is hardened in a short time for the area where the seal member crosses the electric wiring, it is possible to avoid the distortion of the substrate in response to the temperature rise of the substrate due to the long time projection of the ultraviolet ray.

It is thus possible to finish the step of hardening the seal member effectively and quickly, thereby avoiding that (1) the liquid crystal orientation is disturbed due to the inadequate hardening of the seal member and (2) the inadequate filling of the liquid crystal occurs. Accordingly, the fine line seal member can be accurately provided in the vicinity of the pixel without the deterioration of the displaying quality.

When the liquid crystal display apparatus is made by connecting a plurality of such liquid crystal display panels, it is possible to provide the liquid crystal display apparatus in which the connecting part is not noticeable and the displaying quality is excellent.

It is preferable that the transparent electrode is made of indium tin oxide. When the pixel electrode is made of indium tin oxide, since the material of the transparent electrode is same as that of the pixel electrode, the process for forming the pixel electrode can be used as it is in order to form the transparent electrode. Thus, it is not necessary to provide a separate specified manufacturing process for forming the transparent electrode, thereby simplifying the manufacturing process. Accordingly, it is avoidable that the manufacturing cost for forming the transparent electrode is increased.

In order to achieve the foregoing object, a yet another liquid crystal display panel of the present invention is provided with a pair of substrates, an electric wiring provided at least on one of the substrates, and a seal member, applied to the substrate, for combining the pair of substrates so that liquid crystal is filled between the pair of substrates, wherein the electric wiring is provided so as not to cross the seal member in at least one side of four sides of the liquid crystal display panel.

According to the foregoing liquid crystal display panel, it is avoidable that (1) the inadequate hardening of the seal member occurs and (2) some step exists between the electric wiring and the substrate for the side in which the electric wiring does not cross the seal member.

Since the electric wiring on the substrate has a predetermined of thickness, there is generated a step, in the edge portion of the electric wiring, with respect to the substrate. When the seal member is applied to the substrate so as to cross such an electric wiring, it is likely that the seal member is seeped of along the step. When a cell is made by combining the substrates, there are some area whose cell gap of the liquid crystal display panel are different in accordance with whether or not the electric wiring exists. The plane expansion amount becomes greater in the seal member of the area where the cell gap is small and the electric wiring is provided than in the seal member of the area where the cell gap is great and the electric wiring is not provided. It is thus likely that the pattern of the seal member is disturbed. Such seeping of the seal member and disturbance of the pattern of the seal member cause the seal member to erode the pixel area.

However, according to the liquid crystal display panel of the present invention, there exists no step, in the area where the seal member is applied, which is made by the electric wiring and the substrate for the side in which the electric wiring does not cross the seal member. Accordingly, it is possible to apply the seal member which is excellent in the linearity and is not seeped out by the step. When combining the substrates so that a cell is formed, there is no variation, in the area where the seal member exists, of the cell gaps which are generated depending on whether or not the electric wiring exists, thereby resulting in that the seal member is uniformly expanded.

Since (1) it is suppressed that the seal member is seeped out and the pattern of the seal member is disturbed and (2) it is avoided that the seal member erodes the pixel area, it is possible to more accurately provide the seal member in the vicinity of the pixel.

Accordingly, for the side in which the electric wiring does not cross the seal member, the pixel area of the liquid crystal display panel, i.e., the display area can be expanded to the vicinity of the seal member.

When the liquid crystal display apparatus is made by connecting the foregoing plural liquid crystal display panels, it is possible that (1) each display area of the liquid crystal display panels is enlarged and (2) the connecting part of the liquid crystal display panels is not noticeable. In a side (a connecting side), of four sides of each liquid crystal display panel, which is connected with a side of another liquid crystal display panel, the electric wiring is provided so as not to cross the seal member. Thus, in the connecting side, since it is possible to accurately provide the fine line seal member in the vicinity of the pixel, the area for forming the seal member in the panel connecting part can be reduced, thereby resulting in that the connecting part is not noticeable. Accordingly, it is possible to provide a liquid crystal display apparatus having excellent displaying quality.

It is preferable that the foregoing liquid crystal display panel is provided with a step part at the place on the substrate where the seal member is applied, the step part having a step with respect to the substrate. With the arrangement, the seal member applied to the substrate is seeped out to expand along the step part. Thus, the seal member can be uniformly applied along the step part to the substrate with accuracy. Moreover, the seal member expands along the step part during making a cell by combining of the substrates, thereby obtaining a seal member having an more excellent linearity. Accordingly, it is possible to provide a seal member in the vicinity of the pixel with more accurate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

BRIEF DESCRIPTION OF THE DRAWINGS

FIG. 9 shows the state where the seal member is applied so that the substrates are combined.

DESCRIPTION OF THE EMBODIMENTS

[First Embodiment]

The following description describes one embodiment of the present invention with reference to FIGS. 1 through 4. Note that, for convenience sake, the present embodiment describes a liquid crystal display apparatus which realizes a large scope display by connecting neighbouring two liquid crystal display panels.

Figure 1:
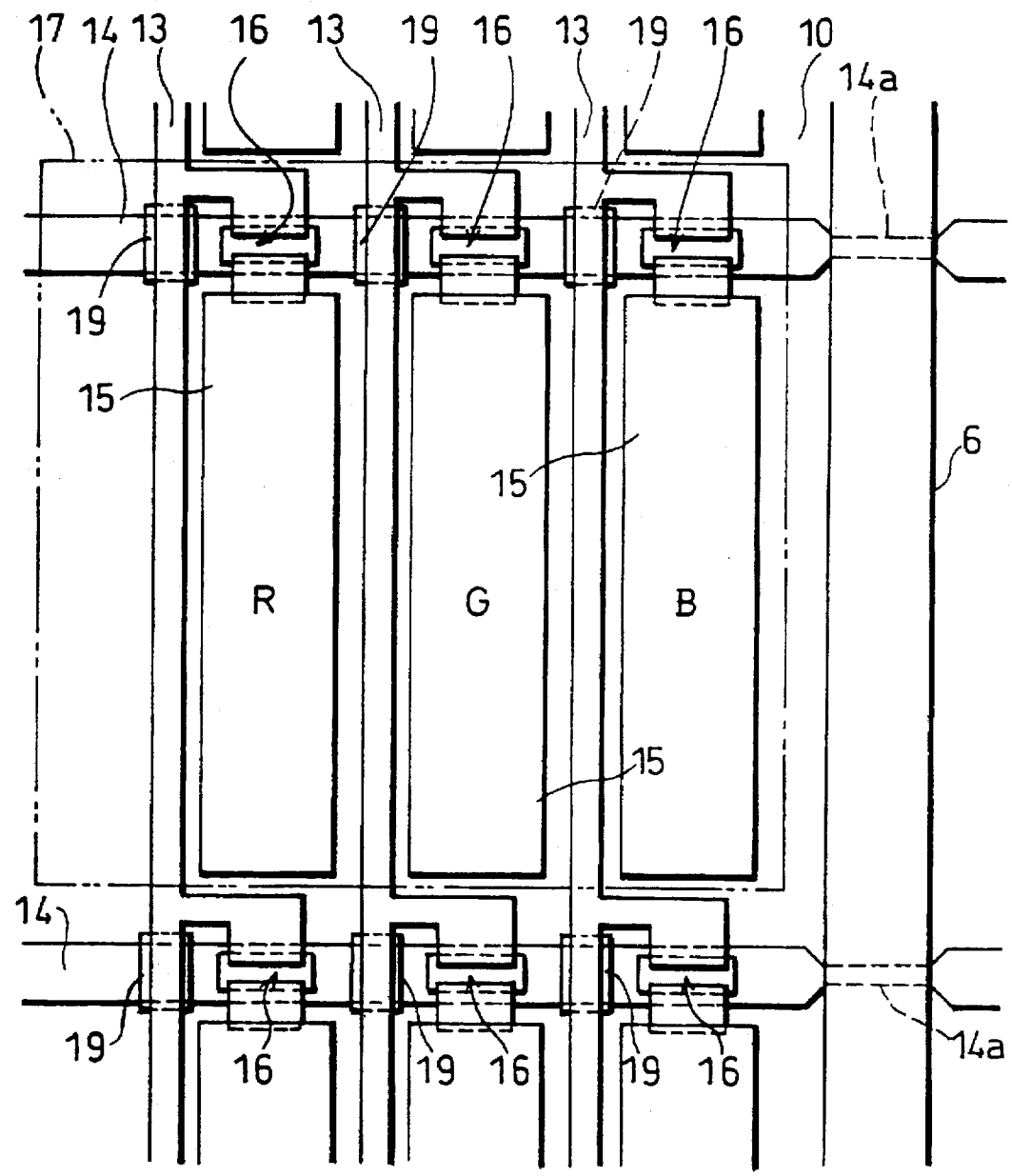
FIG. 1 is a schematic plan view showing the pixel in the vicinity of the area where two liquid crystal display panels, with which a liquid crystal display apparatus of one embodiment in accordance with the present invention is provided, are connected with each other.
Figure 2:
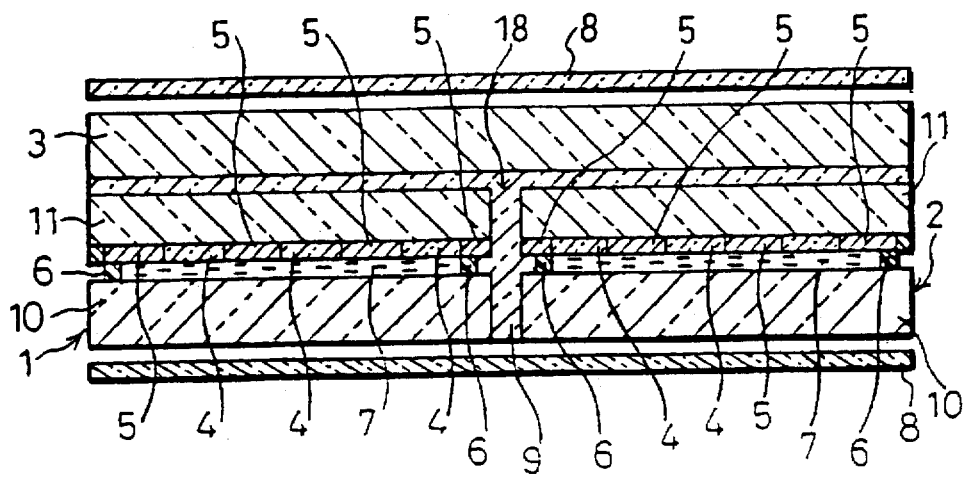
FIG. 2 is a schematic sectional view showing the liquid crystal display apparatus.

The liquid crystal display apparatus of the present embodiment, as show in FIG. 2, is a direct viewing liquid crystal display apparatus. More specifically, two liquid crystal display panels 1 and 2 are planely provided on a single large size transparent substrate 3, the liquid crystal display panels 1 and 2 are neighbouring and connected with each other. There is a back light (not shown) on the rear surface side of the liquid crystal display panels 1 and 2, the back light being made of such as a cold cathode tube. According to the liquid crystal display apparatus having such an arrangement, the user can observe, on the large size transparent substrate 3 side, the image on the liquid crystal display panels 1 and 2 based on the fact that the light projected from the back light is modulated by the liquid crystal display panels 1 and 2.

The liquid crystal display panels 1 and 2 are respectively arranged as follows. More specifically, a TFT substrate 10 and an opposite substrate 11, which are made of a transparent insulating substrate, are combined by a seal member 6 so that a liquid crystal layer 7 is formed into which the liquid crystal is filled and sealed. Accordingly, the liquid crystal display panels 1 and 2 are respectively arranged so that the liquid crystal layer 7 is sandwiched between the TFT substrate 10 and the opposite substrate 11. The seal member 6 is made of a ultraviolet ray hardening resin or a ultraviolet ray hardening resin used in combination with heat hardening for example. The ultraviolet ray hardening resin indicates an acrylic or epoxy family resin, and a polymerization initiator is activated upon projection of the ultraviolet ray so that the resin is hardened. Thus, no thermal hanging occurs, thereby enabling the seal member 6 to be provided in the vicinity of the pixel.

Figure 4:
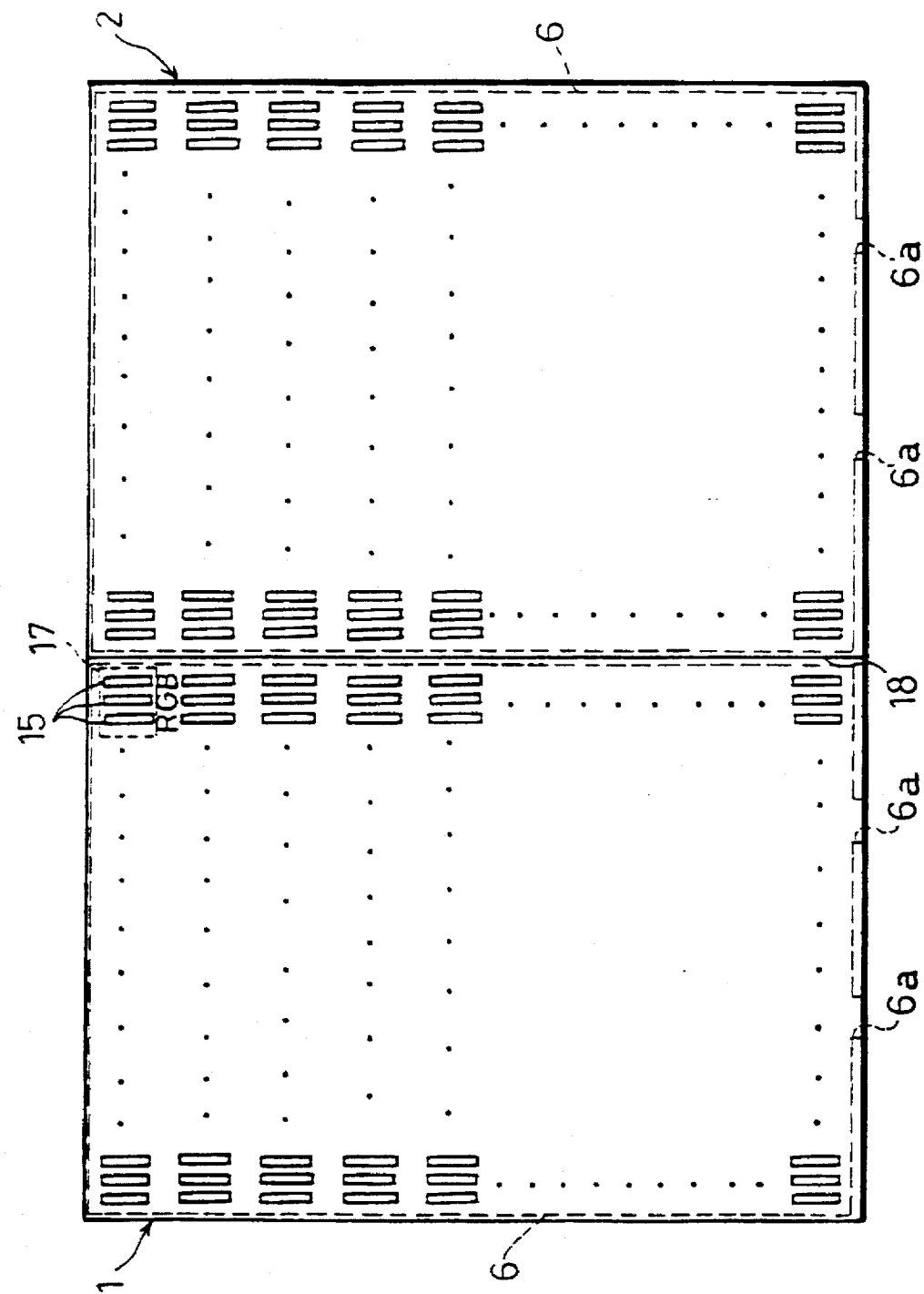
FIG. 4 is an explanatory diagram showing the state where the two liquid crystal display panels are connected with each other.

The seal member 6 is circumferentially provided on the respective liquid crystal display panels 1 and 2 (see FIG. 4). After the seal member 6 is hardened, the liquid crystal is filled into the liquid crystal layer 7 through an opening 6a (filler hole).

Figure 3:
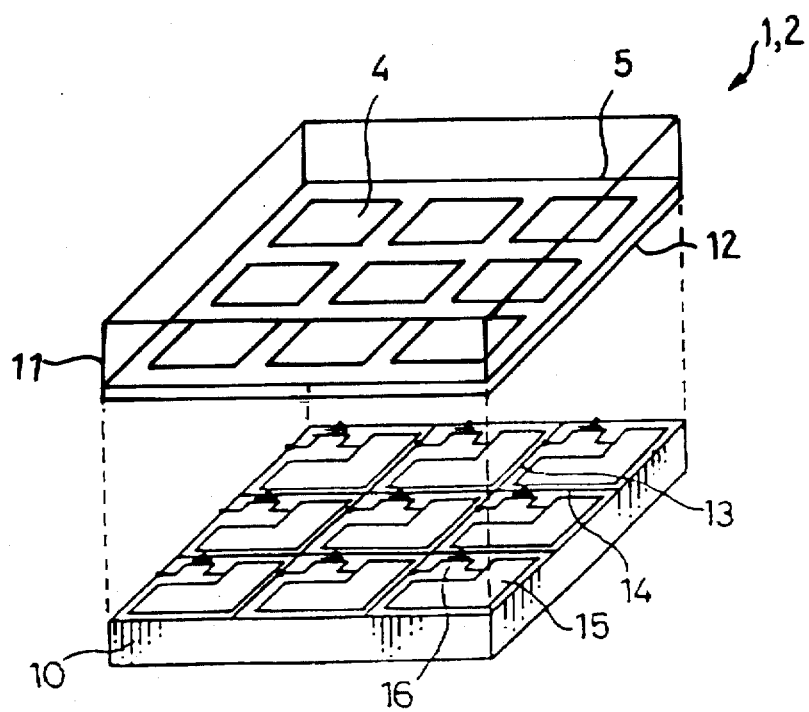
FIG. 3 is an explanatory diagram showing the schematic structure of the liquid crystal display panel.

There are provided on the TFT substrate 10 (a) pixel electrodes 15 in a matrix form and (b) signal electrodes 13 and scanning electrodes 14 (see FIG. 3). There is provided a thin film transistor (TFT) 16 as a switching device around the place where the signal electrode 13 and the scanning electrode 14 cross each other. The pixel electrode 15 is connected with the TFT 16.

The pixel electrode 15 is formed by a transparent conducting film such as ITO (indium tin oxide) for use in a transmissive display apparatus, while is formed by a reflective conducting film such as A1 for use in a reflective display apparatus. The TFT 16 is a field effect transistor using a semidonductor thin film such as amorphous silicon (a-Si:H) and polycrystalline silicon. The TFT 16 controls the supplying of a picture image signal to the pixel electrode 15. The pixel electrode 15 is driven by On/Off operations of the TFT 16 in response to the signals from the signal electrode 13 and the scanning electrode 14.

There is provided a common electrode 12 on the opposite substrate 11. There are also provided, on the opposite substrate 11, (1) color filters 4 having respective R (red), G (green) and B (blue) color filters which correspond to the respective pixel electrodes 15 and (2) a black matrix 5 for separating each pixel part.

The black matrix 5 is provided for blocking the light so that the light is prevented from being guided to a space between the pixel electrodes 15 or to an area where the TFT 16 is provided. For example, when the light transmits the area other than the pixel electrodes 15, the state of displaying black deteriorates in the quality, thereby causing the contrast to be lowered. When the light is guided to the TFT 16, a leak current is generated in a TFT channel due to the photo-excitation, thereby causing the display quality to deteriorate. Such problems are solved by the black matrix 5. The black matrix 5 is formed by a light absorbing film made of a material which shows black upon absorption of the light.

Note that the signal electrode 13, the scanning electrode 14, the pixel electrode 15, and the connecting relation of the TFT 16 are later described in detail.

Each of the TFT substrate 10 and the opposite substrate 11 is provided, on the surface contacting the liquid crystal layer 7 on each opposite surface side, with an orientation film (not shown) for orientating the liquid crystal molecules in a predetermined direction. The orientation film is formed by carrying out the homogeneous arranging treatment based on such as the rubbing method, thereby resulting in that the arrangement direction of the liquid crystal molecules of the sealed nematic liquid crystal having a positive dielectric anisotropic is twisted by 90° between the TFT substrate 10 and the opposite substrate 11. Accordingly, the liquid crystal display panels 1 and 2 drive the liquid crystal molecules based on the twist nematic (TN) display mode.

A refractive index adjustment member 9 is filled in a connecting part 18 (connecting line) between the liquid crystal display panels 1 and 2 (see FIG. 2). The refractive index adjustment member 9 is made of a meterial whose refractive index is substantially the same as those of the TFT substrate 10 and the opposite substrate 11 which constitute the respective liquid crystal display panels 1 and 2.

Note that since the TFT substrate 10 and the opposite substrate 11 are made of a glass substrate (Corning 7059) having a refractive index of 1.53, it is necessary that the refractive index adjustment member 9 be made of a material having a refractive index of 1.53. For example, a ultraviolet ray hardening resin having the following characteristics may be used. Such a ultraviolet ray hardening resin has (1) a double bond such as acrylic and ene/thiol (polyene/polythiol), the double bond being cleft upon projection of the ultraviolet ray to progress the polymerization, and (2) a refractive index becomes 1.53 after the hardening. Note that a refractive index adjustment liquid such as a silicon oil having a refractive index of 1.53 may be substituted for the foregoing refractive index adjustment member 9.

The refractive index adjustment member 9 may be used as an adhesive agent which combines, on the large size transparent substrate 3, the liquid crystal display panels 1 and 2.

Since the refractive index adjustment member 9, whose refractive index is substantially the same as those of the TFT substrate 10 and the opposite substrate 11 which constitute the liquid crystal display panels 1 and 2, is filled in the connecting part 18 between the liquid crystal display panels 1 and 2, it is avoidable that the light is refracted and scattered in the the connecting part 18 due to the irregularity on the edge surfaces of the respective substrates. Thus, it is possible to obtain a natural image in which the connecting part is less noticeable. The refractive index adjustment member 9 is thus filled in the connecting part 18 in order to avoid that the connecting part becomes noticeable based on the fact that the light is scattered in the connecting part 18 due to the irregularity on the edge surfaces of the respective substrates.

Though the refractive index adjustment member 9 may be used as an adhesive agent which combines the liquid crystal display panels 1 and 2 on the large size transparent substrate 3, it is preferable that the refractive index adjustment member 9 is made of a resin whose refractive index is substantially the same as those of the opposite substrate 11 and the large size transparent substrate 3. This is because the display contrast becomes lowered when the light reflection occurs in the interface between the opposite substrate 11 and the large size transparent substrate 3. By the use of the resin having substantially the same refractive index of the opposite substrate 11 and the large size transparent substrate 3, it is possible to obtain a natural image in which the connecting part is much less noticeable.

On each front and rear surfaces of a large size panel which is made by connecting the liquid crystal display panels 1 and 2 according to the foregoing manner, a polarization plate 8 is provided over substantially the whole surface in a polarization direction orthogonal to each other, thereby providing a multi-panel type liquid crystal display apparatus.

The foregoing liquid crystal display apparatus shows black for the light leakage from the connecting part 18 between the liquid crystal display panels 1 and 2 since the polarization plate 8 is in the cross-Nicol state. When the liquid crystal display apparatus is observed from substantially the front, the connecting line of the liquid crystal display panels 1 and 2 can become less noticeable since it is possible to realize the perfect black state due to the cross-Nicol state of the polarization plate 8. Since the black matrix 5, provided in the respective liquid crystal display panels 1 and 2, is formed by an optical absorption film which is made of a material which shows black upon light absorption, no light reflection from the surface due to the black matrix 5 occurs, thereby resulting in that the connecting line can be much less noticeable.

In the liquid crystal display panels 1 and 2, each pixel electrode 15 corresponds to each color filter 4 having R, G and B color filters (see FIG. 3). Accordingly, a single pixel 17 is composed of three R, G and B pixel electrodes 15 (see FIG. 1).

The single pixel 17 is driven by the TFT 16 connecting to each pixel electrode 15. Each TFT 16 is connected to a signal electrode 13 and a scanning electrode 14 which are electrically insulated with each other by an insulation film 19 so as to independently drive a pixel electrode 15. The seal member 6 is provided in the vicinity of the pixel 17 so as to planely cross the scanning electrode 14. As mentioned before, since the seal member 6 is made of the ultraviolet ray hardening resin or the ultraviolet ray hardening resin used in combination with heat hardening, no thermal hanging occurs, thereby enabling the seal member 6 to be provided in the vicinity of the pixel 17.

The scanning electrode 14 is provided, in the area where the scanning electrode 14 crosses the seal member 6, with a fine line part 14a which is finer than other parts of the scanning electrode 14. The fine line part 14a is configured so that its width becomes narrow in the area where the seal member 6 planely crosses the scanning electrode 14. With the configuration, the ultraviolet ray projected from outside the TFT substrate 10 is guided through the fine line part 14a to the seal member 6 which planely crosses the scanning electrode 14, so that the seal member 6 is hardened. In such a case, when the width of the fine line part 14a of the scanning electrode 14 is not more than 50 microns, the ultraviolet ray projection for a short time so that the liquid crystal display panels 1 and 2 has no heat distortion can make the seal member 6 hardened effectively.

It is necessary to provide, in the vicinity of the connecting part, the seal member 6 as close as possible to the pixel 17, so that the connecting part of the liquid crystal display panels becomes less noticeable. The ultraviolet ray hardening resin or the ultraviolet ray hardening resin used in combination with heat hardening is used as the seal member 6. Since the seal member 6 made of such resin brings the advantages that (1) less turbulence in the liquid crystal display occurs in the vicinity of the seal member 6 and (2) the positioning accuracy during combining the substrates 10 and 11 becomes improved, it is adaptable for the case where the seal member 6 is provided in the vicinity of the pixel 17 like the present embodiment and the case where the size of the pixel is small and the high accurate combining of the substrates is required like the small size liquid crystal display apparatus for use in a view finder of such as a video camera.

When hardening the seal member 6, i.e., when hardening the ultraviolet ray hardening resin, it is necessary that the ultraviolet ray externally be projected.

However, in the foregoing liquid crystal display apparatus in which the liquid crystal display panels 1 and 2 are connected, the seal member 6 is provided beneath the black matrix 5 so that the connecting part is not noticeable. Such arrangement makes it impossible that the ultraviolet ray is externally projected to the seal member 6 from the opposite substrate 11 side, the substrate 11 being provided with the black matrix 5. Accordingly, the ultraviolet ray must be externally projected to the seal member 6 from the TFT substrate 10 side, the TFT substrate being provided with the TFTs.

Figure 14:
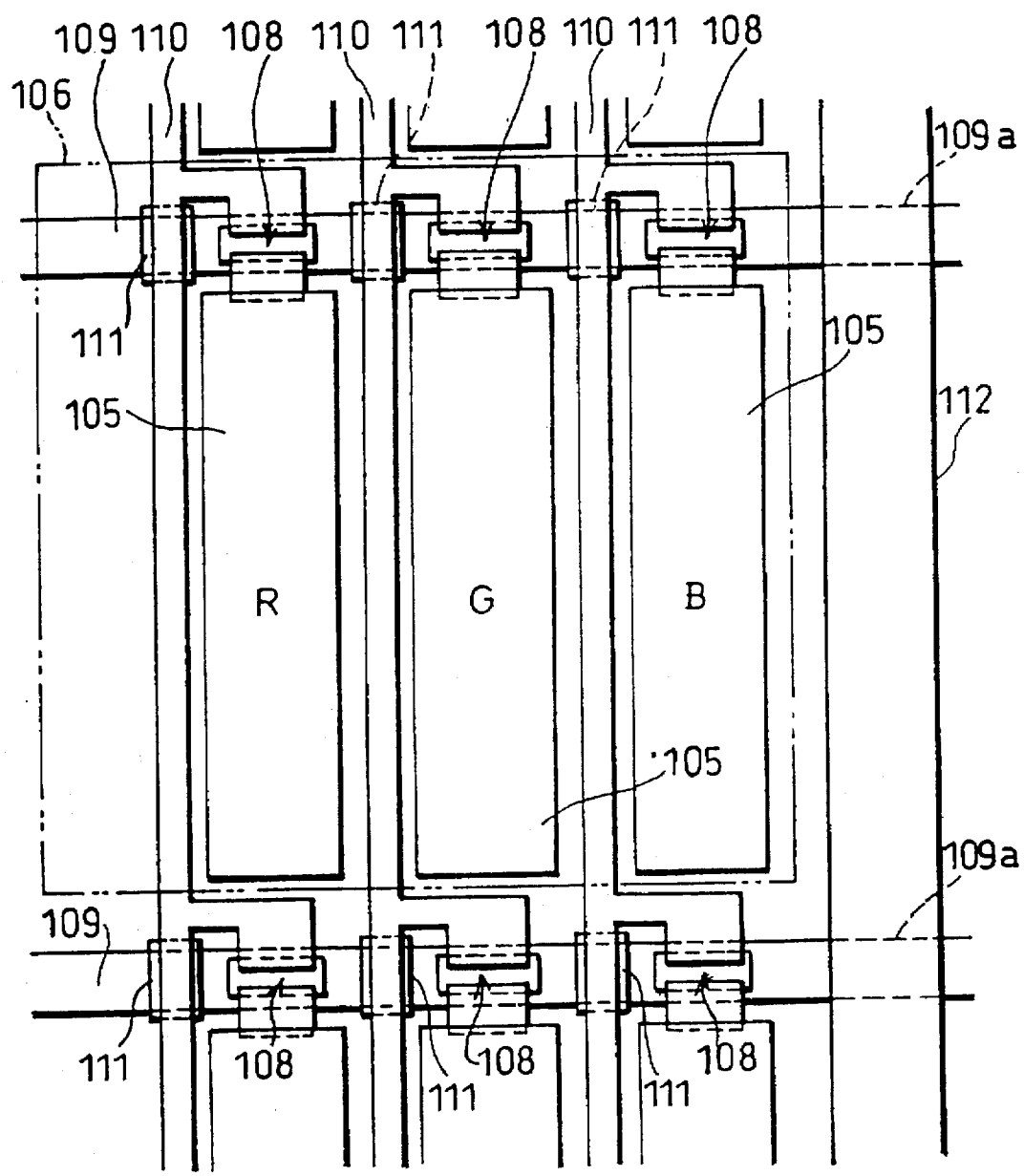
FIG. 14 is a schematic plan view showing the pixel in the vicinity of the area where two liquid crystal display panels, with which another conventional liquid crystal display apparatus is provided, are connected with each other.
Figure 15:
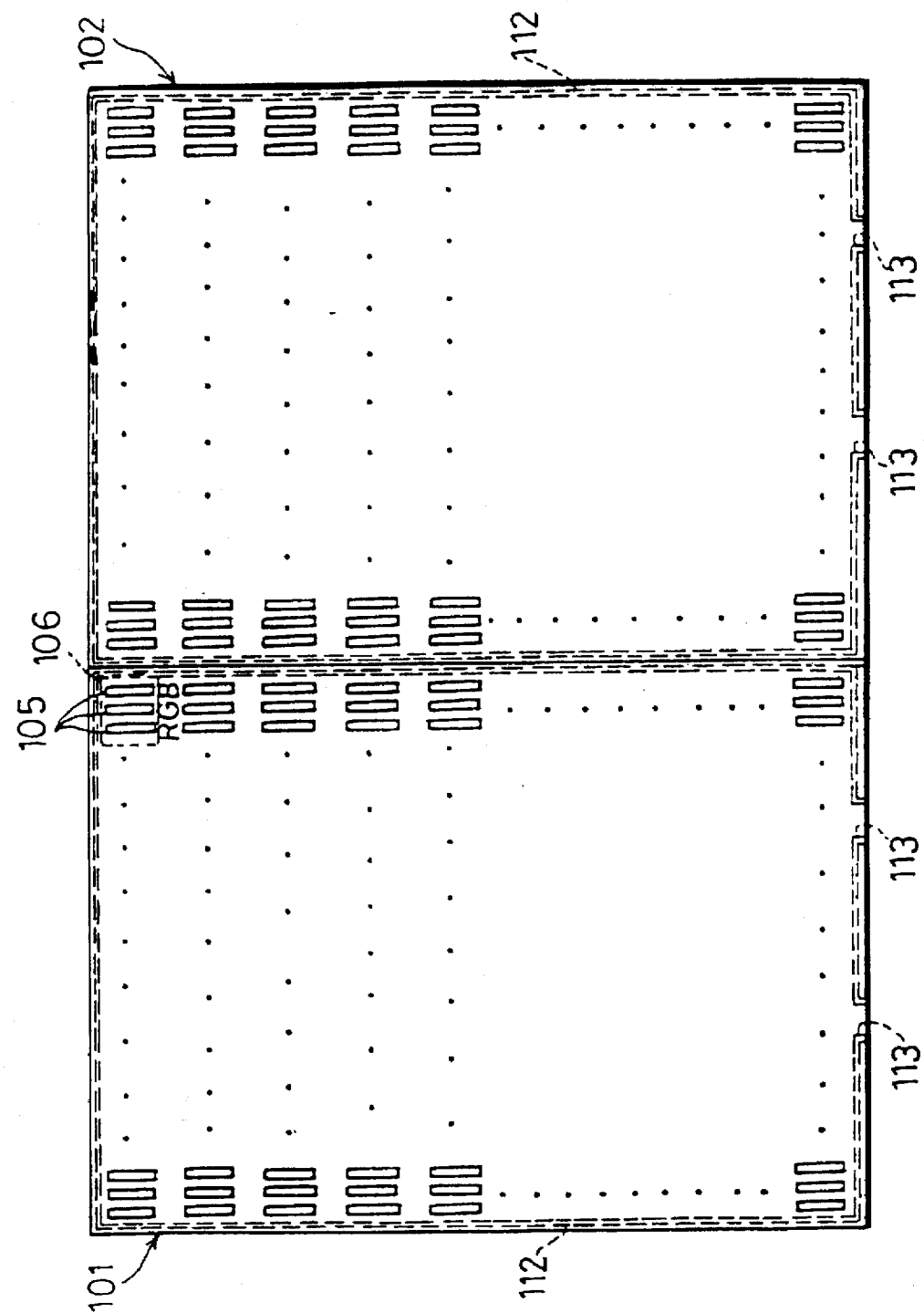
FIG. 15 is an explanatory diagram showing the state where the two liquid crystal display panels are connected with each other.

According to the conventional electrode wiring pattern as shown in FIG. 14, when the ultraviolet ray is projected to the seal member 112 from the TFT substrate side, the ultraviolet ray is blocked by the crossing part 109a where the seal member 112 crosses the scanning electrode 109, thereby causing the inadequate projection of the ultraviolet ray onto the seal member 112 on the scanning electrode 109. Especially, (1) in case of the liquid crystal display apparatus having a scope of about 30-inch or (2) in the case where the scanning electrode 109 combines an electrode causing to generate the auxiliary capacitance, it is required that the line width of the scanning electrode 109 be at least 100 microns.

When the line width of the scanning electrode 109 in the liquid crystal display panel is thus very broad (about 100 microns), it is likely that the ultraviolet ray is not fully projected onto the seal member 112 on the crossing part 109a so as to cause the inadequate hardening of the seal member 112, although the ultraviolet ray lamp projects the ultraviolet ray on the seal member 112 made of the ultraviolet ray hardening resin or the ultraviolet ray hardening resin used in combination with heat hardening.

In the case where the inadequate hardening of the seal member 112 thus occurs, it is not possible to keep a predetermined vacuum level inside the liquid crystal cell when the filling of the liquid crystal is made under vacuum, thereby presenting the problems that (1) the liquid crystal is not fully filled and (2) the liquid crystal orientation in the vicinity of the seal member 112 is disturbed.

Since the scanning electrode 14 is provided, in the area where the scanning electrode 14 crosses the seal member 6, with the fine line part 14a according to the present embodiment, it is possible to fully project the ultraviolet ray onto the seal member 6, even in the area where the scanning electrode 14 crosses the seal member 6, without the ultraviolet ray blocking of the scanning electrode 14, thereby enabling to avoid the inadequate hardening of the seal member 6. Especially, when the width of the fine line part 14a is not more than 50 microns, the ultraviolet ray projection for a short time can make the seal member 6 perfectly hardened on the scanning electrode 14, thereby resulting in that the bad affection arising from the projection of the ultraviolet ray for a long time can be eliminated, i.e., no heat distortion, due to the fact that the ultraviolet ray has been projected with respect to the liquid crystal display panels 1 and 2 for a long time, occurs in the panels 1 and 2.

Accordingly, the liquid crystal display panels 1 and 2 having the foregoing arrangement can eliminate the pattern disturbance of the seal member 6 and the orientation disturbance of the liquid crystal in the vicinity of seal member 6, thereby enabling to realize a liquid crystal display apparatus in which (1) the connecting part 18 of the panels 1 and 2 is not noticeable and (2) the displaying quality is excellent.

Note that although the TN mode is adopted as the mode for driving the liquid crystal according to the present embodiment, the present invention is not limited to such mode only. For example, the present invention is adaptable to the case where the liquid crystal is driven in accordance with the STN (super twisted nematic) mode.

[Second Embodiment]

Figure 5:
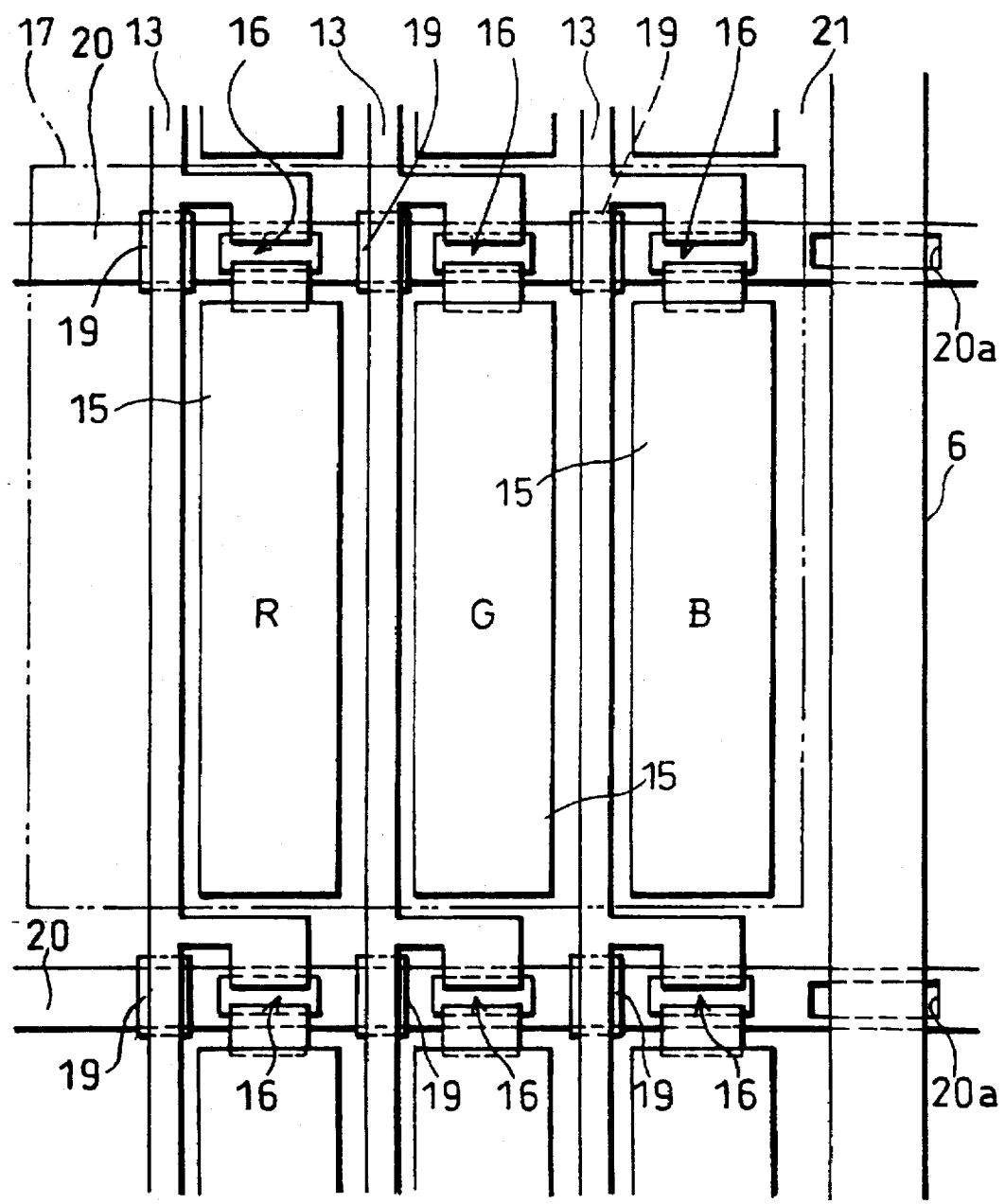
FIG. 5 is a schematic plan view showing the pixel in the vicinity of the place where two liquid crystal display panels, with which a liquid crystal display apparatus of another embodiment in accordance with the present invention is provided, are connected with each other.

The following description describes another embodiment of the present invention with reference to FIG. 5. Note that, for convenience sake, the same reference numeral is assigned to the member which has the same function as that of the first embodiment, and the description thereof is omitted here.

A liquid crystal display apparatus in accordance with the present embodiment is provided with a TFT substrate 21 (see FIG. 5). The TFT substrate 21 has an opening 20a in the area where a seal member 6 crosses a scanning electrode 20.

The opening 20a of the scanning electrode 20 has (1) a length in a scanning electrode 20 direction which is slightly greater than the width of the seal member 6 and has (2) a width slightly narrower than that of the scanning electrode 20. Through the opening 20a, the ultraviolet ray can be adequately projected from outside the TFT substrate 21 onto the seal member 6 on the area where the seal member 6 crosses the scanning electrode 20. Thus, the seal member on the area where the seal member 6 crosses the scanning electrode 20 can be adequately hardened.

As mentioned above, the opening 20a is formed in the area where the seal member 6 crosses the scanning electrode 20, thereby enabling to obtain the similar effects to the foregoing first embodiment.

Note that the shape of the opening 20a of the scanning electrode 20 has no limitation provided that the ultraviolet ray can be adequately projected from the TFT substrate 21 side onto the seal member 6 on the area where the seal member 6 crosses the scanning electrode 20. The size of the opening 20a is set by taking at least the line width of the scanning electrode 20 into consideration.

[Third Embodiment]

Figure 6:
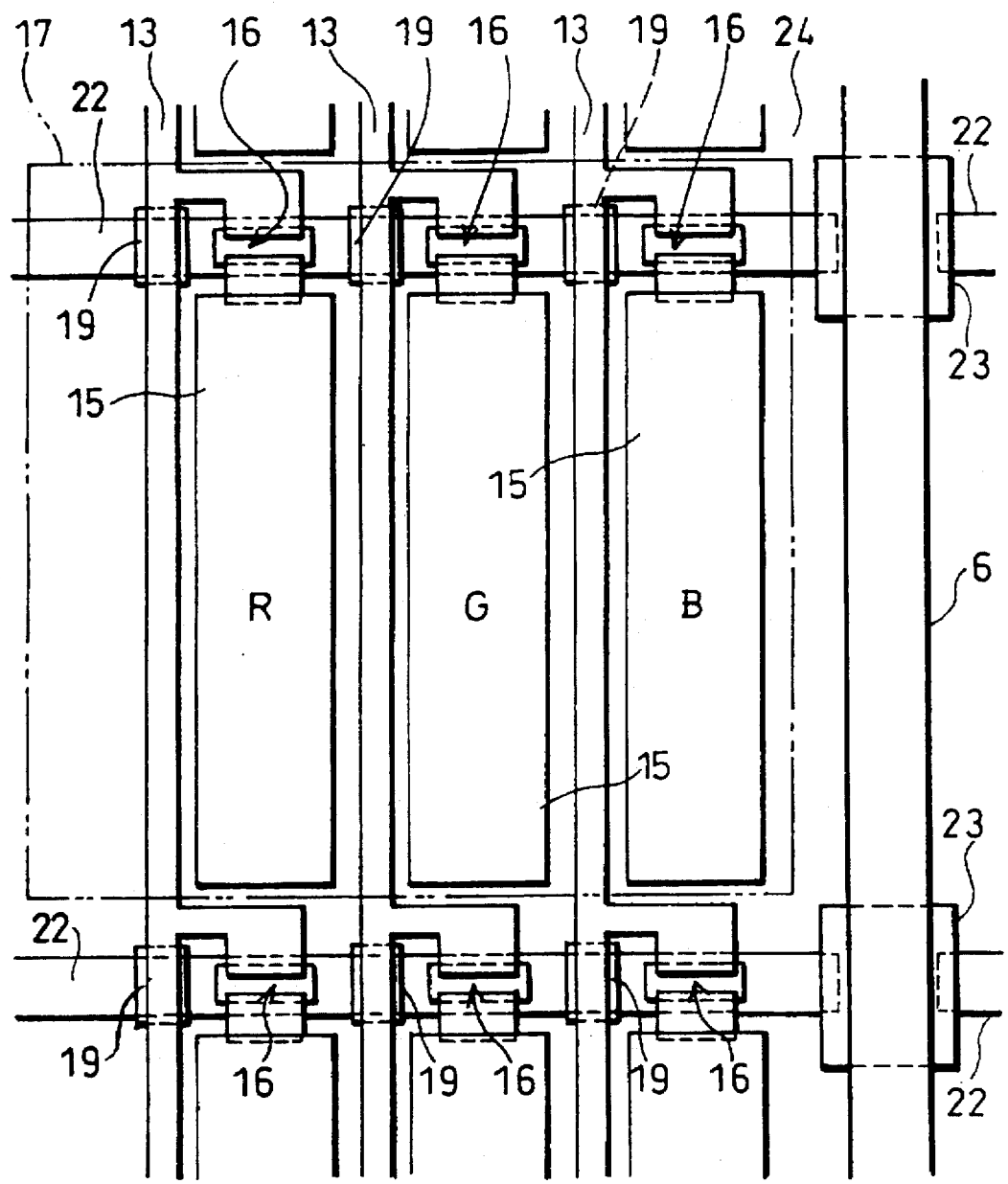
FIG. 6 is a schematic plan view showing the pixel in the vicinity of the area where two liquid crystal display panels, with which a liquid crystal display apparatus of a further embodiment in accordance with the present invention is provided, are connected with each other.

The following description describes a still another embodiment of the present invention with reference to FIG. 6. Note that, for convenience sake, the same reference numeral is assigned to the member which has the same function as that of the first embodiment, and the description thereof is omitted here.

A liquid crystal display apparatus in accordance with the present embodiment is provided with a TFT substrate 24 (see FIG. 6). According to the TFT substrate 24, the crossing area between a seal member 6 and a scanning electrode 22 is cut off, so that the seal member 6 does not cross the scanning electrode 22, and the two cut off parts of each scanning electrode 22 is connected to a transparent electrode 23.

The transparent electrode 23 is arranged so that the ultraviolet ray can be adequately projected onto the seal member 6 on a transparent electrode 23. The transparent electrode 23 has no limitation provided that the transparent electrode 23 has a percentage transmission of not less than 50 percent with respect to the ultraviolet ray having a wave length of 365 nm. For example, the transparent electrode 23 can be made of indium tin oxide (ITO). Since a pixel electrode 15 may be also made of indium tin oxide, the transparent electrode 23 and the pixel electrode 15 may be made of the same single material, thereby resulting in that the convenience on the manufacturing process can be obtained.

The transparent electrode 23 has a width broader than that of the scanning electrode 22. The reason is as follows. When the transparent electrode 23 and the scanning electrode 22 have the same width, the wiring resistance becomes great since the ITO has generally a plane resistance higher than that of the scanning electrode 22 used for the electric wirings. However, it is possible to reduce the wiring resistance by the foregoing arrangement wherein the transparent electrode 23 has a width broader than that of the scanning electrode 22.

As mentioned above, since (1) the transparent electrode 23 is provided in the area where the scanning electrode 22 crosses the seal member 6 and (2) the transparent electrode 23 is electrically connected to the scanning electrode 22, the ultraviolet ray can be adequately projected onto the seal member 6 from the TFT substrate 24 side. Accordingly, the ultraviolet ray can be projected more onto the seal member 6 on the transparent electrode 23 than the seal member 6 on the fine line part 14a which is obtained by making the width of the scanning electrode 14 narrower.

With the arrangement, the ultraviolet ray projection for a short time can make the seal member 6 hardened in the area of the scanning electrode 22 where the seal member 6 crosses the scanning electrode 22, thereby resulting in that the heat distortion due to the temperature rise of the substrate arising from the projection of the ultraviolet ray for a long time can be eliminated.

Since it is not necessary to make the width of the scanning electrode 22 narrow, it is possible to adequately harden the seal member 6 on the scanning electrode 22 even in the case where it is impossible to make the width of the scanning electrode 22 narrow so that the scanning electrode 22 combines an electrode causing to generate the auxiliary capacitance.

Note that although the present embodiment describes the arrangement wherein the transparent electrode 23 is provided in the area where the scanning electrode 22 is cut off around the seal member 6, the present invention is not limited to such an arrangement. Such an arrangement may be substituted for the arrangement wherein a transparent electrode is provided with respect to (1) the scanning electrode 20 whose shape is disclosed in the foregoing second embodiment or to (2) a scanning electrode having other shape.

The foregoing first to third embodiments describe the liquid crystal display apparatus wherein the liquid crystal display panels are connected with each other. However, the present invention is not limited thereto. The liquid crystal display apparatus wherein at least a seal member is made of the ultraviolet ray hardening resin or the ultraviolet ray hardening resin used in combination with heat hardening, falls within the scope of the present invention; for example, a small size liquid crystal display apparatus for use in a view finder of such as a video camera.

[Fourth Embodiment]

Figure 7:
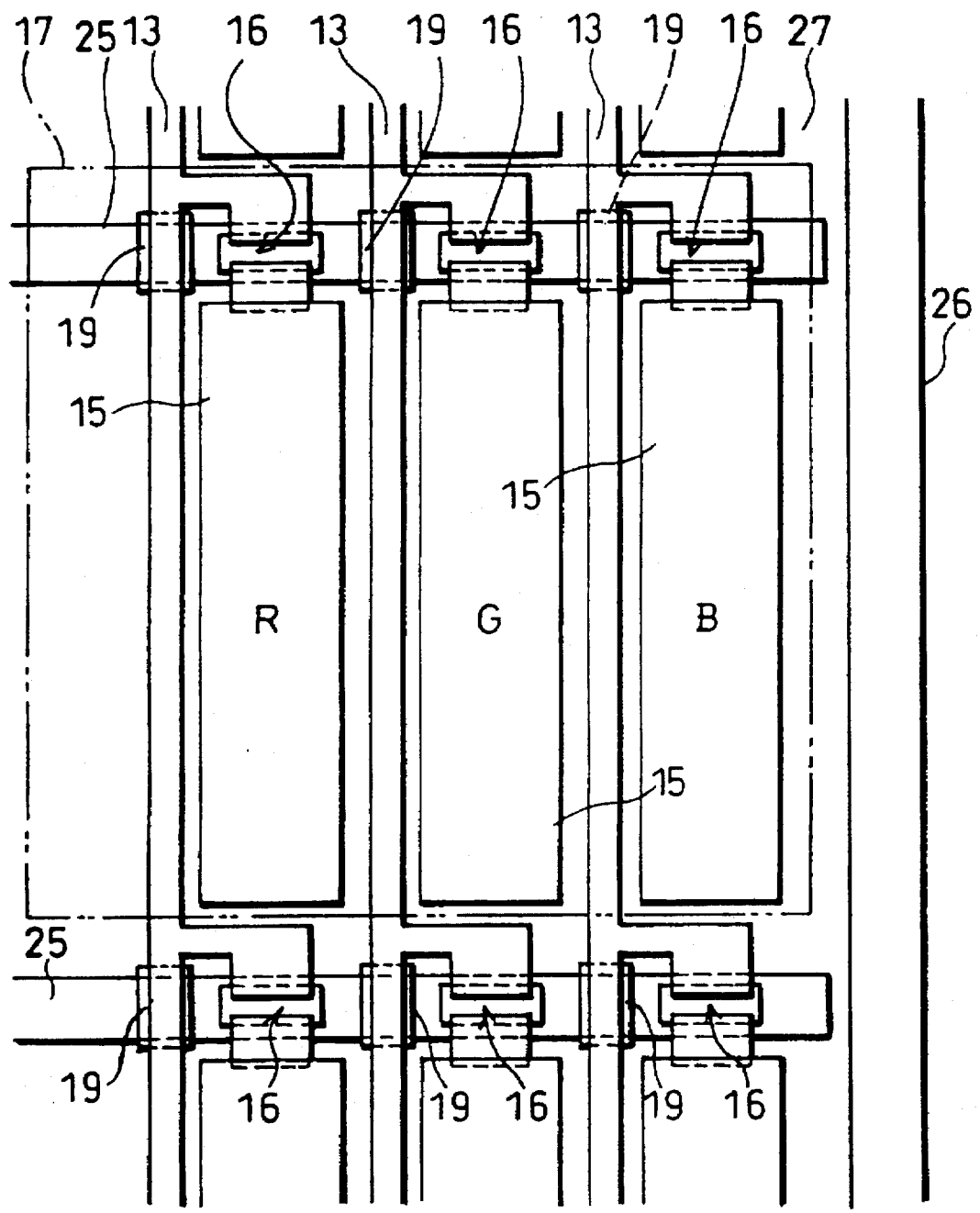
FIG. 7 is a schematic plan view showing the pixel in the vicinity of the place where two liquid crystal display panels, with which a liquid crystal display apparatus of still a further embodiment in accordance with the present invention is provided, are connected with each other.
Figure 8:
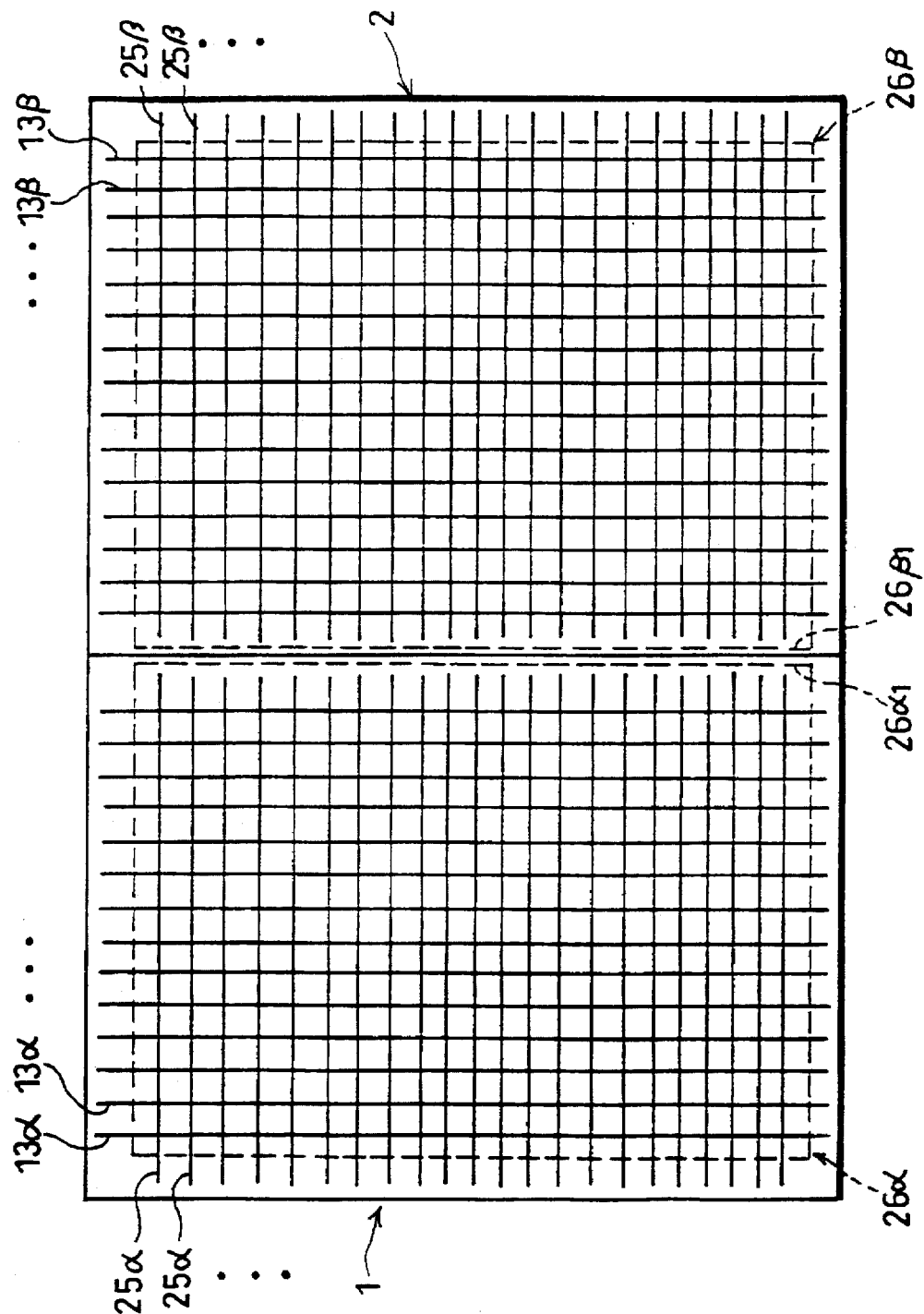
FIG. 8 is an explanatory diagram showing how the pattern of the electric wiring relates to the pattern of the seal member in the two liquid crystal display panels.
Figure 9:
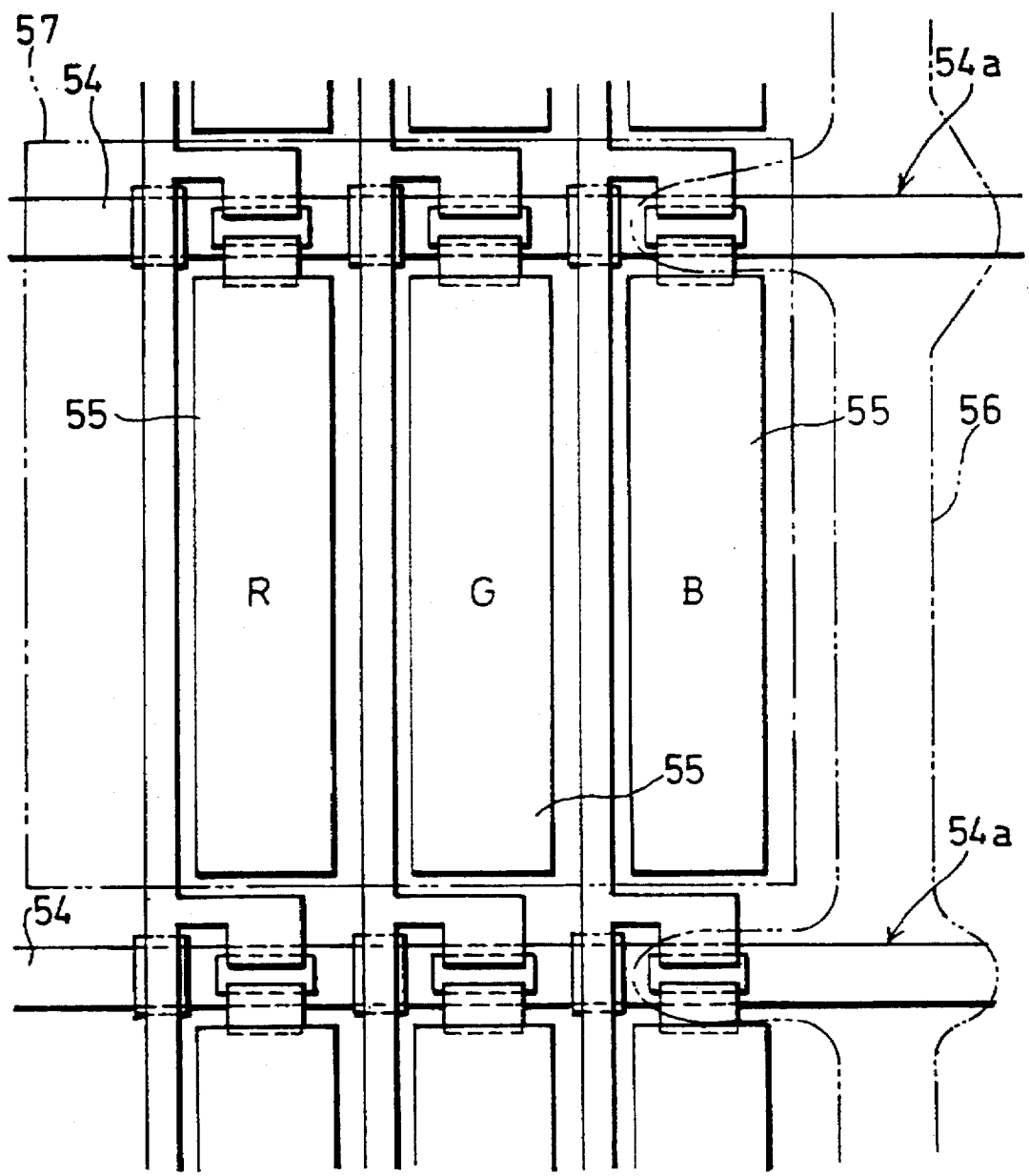
FIG. 9 is a schematic plan view showing the pixel in the vicinity of the place where two liquid crystal display panels, with which a conventional liquid crystal display apparatus is provided, are connected with each other.

The following description describes a further embodiment of the present invention with reference to FIGS. 7 through 9. Note that, for convenience sake, the same reference numeral is assigned to the member which has the same function as that of the first embodiment, and the description thereof is omitted here.

A liquid crystal display apparatus in accordance with the present embodiment is provided with a TFT substrate 27 (see FIG. 7). The TFT substrate 27 is arranged so that each scanning electrode 25 does not cross a seal member 26 which is provided around the connecting part between liquid crystal display panels 1 and 2.

A ultraviolet ray hardening resin or a ultraviolet ray hardening resin used in combination with heat hardening is used as the seal member 26, such resin having a viscosity of 10000 cps to 100000 cps.

Since the foregoing liquid crystal display apparatus is arranged so that each scanning electrode 25 does not cross a seal member 26, no inadequate hardening of the seal member 26 and no distortion of the substrate occur during hardening of the seal member 26, thereby making it possible that the seal member 26 finishes the hardening in a short time. Accordingly, such arrangement can obtain the similar effects to the foregoing first embodiment.

With the foregoing arrangement, it is possible not only to avoid the inadequate hardening of the seal member 26 but also to avoid that the seal member 26 is seeped out or the pattern of the seal member 26 is disturbed. More detail description is made below with reference to FIG. 9.

FIG. 9 shows the connecting part between the liquid crystal display panels which the connecting type conventional liquid crystal display apparatus has. FIG. 9 is an explanatory drawing showing the state where, in manufacturing, substrates are combined after a seal member 56 is provided around a pixel 57. When the seal member 56 is made of the resin whose viscosity is of 10000 cps to 100000 cps, the seal member 56 is seeped out, in the vicinity of crossing part 54a between the applied seal member 56 and a scanning electrode 54, along the scanning electrode 54 toward a pixel electrode 55 (see FIG. 9). Such seeping of the seal member 56 occurs for the following reason.

The scanning electrode 54 is formed by patterning a metal film such as Ta, Cr and Mo based on the photolithography. In ordinary, such metal film has a thickness of 2000 Å to 5000 Å, thereby causing to generate a step with respect to the substrate at the edge portion of the scanning electrode 54. When the seal member 56 is applied so as to cross the scanning electrode 54, the seal member 56 is gradually seeped out along the step which is formed between the scanning electrode 54 and the substrate, and which has a height of 2000 Å to 5000 Å.

Even when combining the substrates for making a cell, there are some areas whose cell gap of the liquid crystal display panel are different in accordance with whether or not the electric wiring such as the scanning electrode 54 exists. The plane expansion amount becomes greater in the seal member 56 of the area where the cell gap is small (i.e., the seal member 56 on the electric wiring) than in the seal member of the area where the cell gap is great (i.e., the area where the electric wiring is not provided). It is thus likely that the pattern of the seal member 56 is disturbed.

Such seeping of the seal member 56 and disturbance of the pattern of the seal member 56 cause the seal member 56 to erode the pixel area 57, thereby causing the displaying quality to deteriorate.

However, the liquid crystal display apparatus of the present embodiment, as mentioned above, is arranged so that each scanning electrode 25 does not cross the seal member 26 around the connecting part between the liquid crystal display panels (see FIG. 7). More specifically, since no step, which is made by the TFT substrate 27 and the scanning electrode 25, exists in the area where the seal member 26 is applied to the TFT substrate 27, no seeping of the seal member 26 due to the step occurs, thereby making a seal pattern which is excellent in the linearity. When combining the substrates so that a cell is formed, there is no variation, in the area where the seal member 26 exists, of the cell gaps which are generated depending on whether or not the scanning electrode exists, thereby resulting in that the seal member 26 is uniformly expanded. Accordingly, the seal member 26 can be accurately disposed.

Since (1) it is suppressed that the seal member 26 is seeped out and the pattern of the seal member 26 is disturbed and (2) it is avoided that the seal member 26 erodes the pixel 17 area, it is possible to more accurately provide the fine line seal member 26 in the vicinity of the pixel 17. Thus, since the seal member 26 in the vicinity of the connecting part between the liquid crystal display panels 1 and 2 becomes less noticeable, it is possible to realize a liquid crystal display apparatus which is excellent in the displaying quality.

FIG. 8 is an explanatory drawing showing how the pattern of the electric wiring relates to the pattern of the seal member in the liquid crystal display panels 1 and 2. Note that the opening (filler hole) of the seal member 26 is omitted in FIG. 8. The TFT substrates 27 of the respective liquid crystal display panels 1 and 2 are provided, in the electrode wiring pattern, with signal electrodes $13\alpha$ and signal electrodes $13\beta$ respectively in the up and down direction of FIG. 8, while with scanning electrodes $25\alpha$ and scanning electrodes $25\beta$ respectively in the left and right direction of FIG. 8.

As shown in FIG. 8, the scanning electrodes $25\alpha$ and $25\beta$ as the electric wirings are provided so as not to cross seal member $26\alpha_1$ and $26\beta_1$ respectively. Seal members $26\alpha$ and $26\beta$ are provided along the four sides of the respective liquid crystal display panels 1 and 2. The seal members $26\alpha_1$ and $26\beta_1$ are one of the seal members $26\alpha$ and $26\beta$ respectively and are provided along respective connecting sides which become the connecting part between the liquid crystal display panels 1 and 2. With the arrangement, it is possible to provide the seal member $26\alpha_1$ and $26\beta_1$ in the vicinity of the pixel with accuracy in a fine line manner. Accordingly, it is possible to reduce the area required for forming the seal members $26\alpha_1$ and $26\beta_1$ in the connecting part, thereby resulting in that the connecting part of the liquid crystal display panels 1 and 2 is not noticeable.

Accordingly, it is possible to provide a liquid crystal display apparatus in which the connecting part is not noticeable and the displaying quality is excellent by the use of the liquid crystal display apparatus wherein the foregoing liquid crystal display panels 1 and 2 are connected with each other.

Note that in the liquid crystal display apparatus wherein the driving of the liquid crystal is carried out by use of the auxiliary capacitance (Cs) generated by combination of the pixel electrode 15 followed by the scanning electrode 25 and the scanning electrode 25, the lightning test of the liquid crystal display panels 1 and 2 may be carried out in accordance with the following manner.

More specifically, when making the lightning test by supplying signals to the respective scanning electrodes $25\alpha$ and 25β, a gate signal and Cs (auxiliary capacitance) signal are alternately supplied, from one side through which the electrodes of the scanning electrodes 25α and 25β are drawn, to the respective scanning electrodes 25α and 25β for every one line. For example, the gate signal is supplied to the odd lines of the respective scanning electrodes 25α and 25β, while the Cs signal is supplied to the even lines. The respective gate and Cs signals are interchanged in accordance with respective predetermined timings. Namely, the Cs signal is supplied to the line to which the gate signal has been supplied while the gate signal is supplied to the line to which the Cs signal has been supplied. Such supplying of the signals are made by a prober having the contacting terminals whose number is the same as that of the scanning electrodes 25α and 25β. In such a case, it is required to position the terminals of the scanning electrodes and the top ends of the prober.

As mentioned above, the signals are supplied to the respective scanning electrodes 25α and 25β from one side through which the electrode terminals are drawn, thereby enabling to make the lightning test of the liquid crystal display panels 1 and 2.

[Fifth Embodiment]

Figure 10:
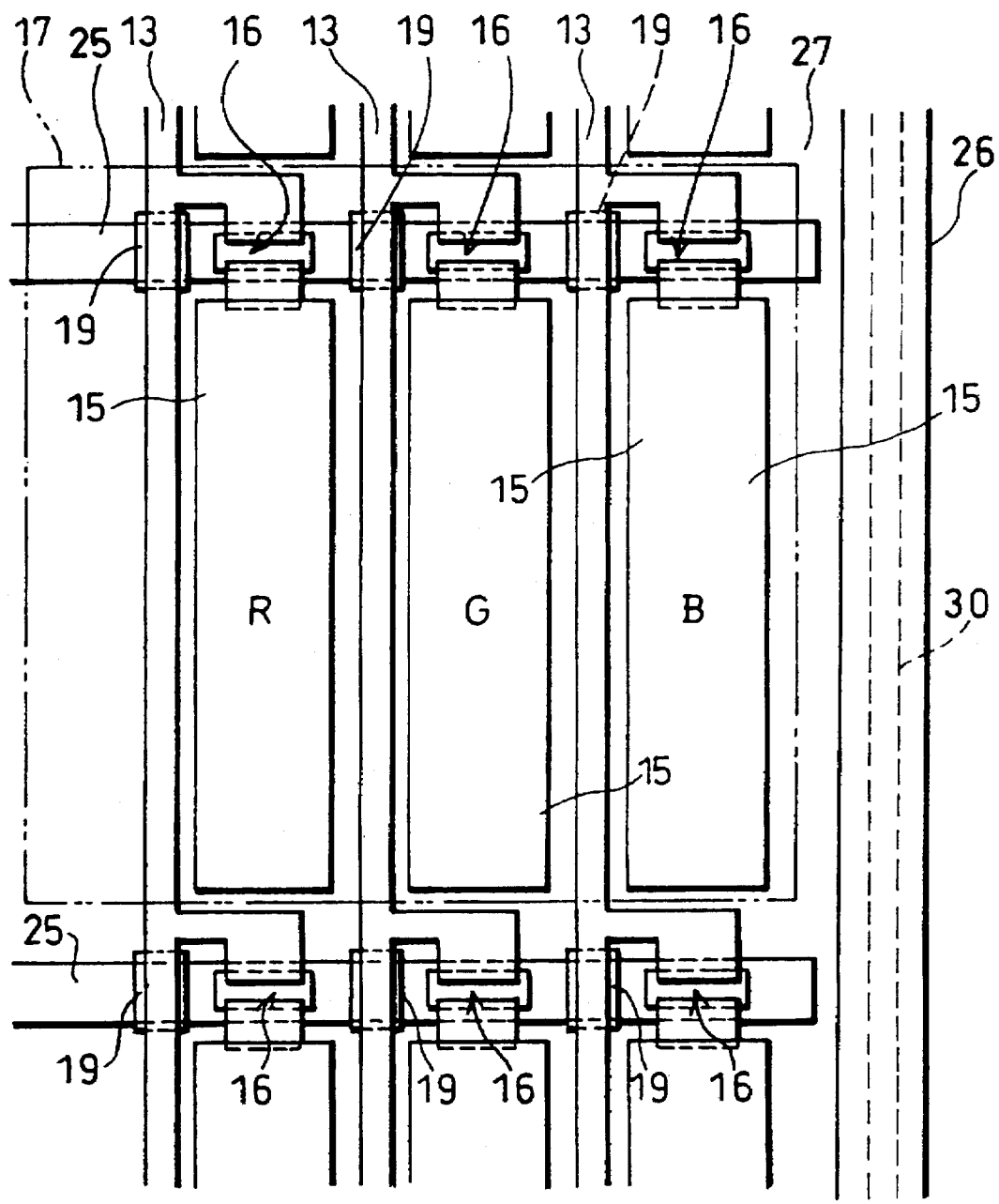
FIG. 10 is a schematic plan view showing the pixel in the vicinity of the place where two liquid crystal display panels, with which a liquid crystal display apparatus of still an even further embodiment in accordance with the present invention is provided, are connected with each other.

The following description describes a still further embodiment of the present invention with reference to FIG. 10. Note that, for convenience sake, the same reference numeral is assigned to the member which has the same function as that of the fourth embodiment, and the description thereof is omitted here.

As shown in FIG. 10, a liquid crystal display apparatus in accordance with the present embodiment is provided with a seal guide line 30 (an island) as the step part on the area where the seal member 26 of the fourth embodiment (see FIG. 7) is applied so that a step is formed with respect to a TFT substrate 27. It is preferable that the seal guide line 30 is made of the same material as that of (1) a conductive film such as Ta, Cr and Mo forming a scanning electrode 25 or (2) a conductive film such as Ti, Ta and Mo forming a signal electrode 13. When the seal guide line 30 is made of the same material as that of the scanning electrode 25 or the signal electrode 13, the seal guide line 30, the scanning electrode 25 and the signal electrode 13 are simultaneously patterned for the formation thereof. Accordingly, no specific process is separately required for forming the seal guide line 30.

In the case where the ultraviolet ray hardening resin or the ultraviolet ray hardening resin used in combination with heat hardening, whose viscosity is of 10000 cps to 100000 cps, is used as the seal member, the seal member generally has the characteristic, when the TFT substrate 27 is provided with some step such as recessions and protrusions, that it seeps out along the step.

Accordingly, when the seal guide line 30 having the step with respect to the TFT substrate 27 is formed in the area where the seal member 26 should be applied to the TFT substrate 27, the seal member 26 is seeped out along the seal guide line 30, thereby enabling to apply the seal member 26 to the TFT substrate 27 in a straight line. When the cell is made by combining the substrates, since the seal member 26 is seeped out along the seal guide line 30 and uniformly expanded, it is possible to provide the seal member 26 in the vicinity of a pixel 17 with more accuracy.

Note that although the case where the seal guide line 30 is the step part of island is disclosed, the present invention is not limited to such a case. For example, a step part of depressions or a step of recessions and protrusions may be substituted therefor provided that a step is provided with respect to the TFT substrate 27 (ground substrate).

Additionally, it is not necessary that a single seal guide line 30 is provided for every seal pattern (see FIG. 10). A plurality of seal guide lines 30 may be provided for every seal pattern.

When the ultraviolet ray hardening resin or the ultraviolet ray hardening resin used in combination with heat hardening is used as the seal member 26, it is preferable that the line width of the seal guide lines 30 is set to not more than 100 microns so that the seal guide lines 30 does not interrupt the projection of the ultraviolet ray during projecting the ultraviolet ray onto the seal member 26.

Although the foregoing embodiment describes the case where the ultraviolet ray hardening resin or the ultraviolet ray hardening resin used in combination with heat hardening is used as the seal member 26, the present invention is not limited thereto. The heat hardening resin may be substituted for the foregoing resins provided that the disturbance of the liquid crystal display is kept small around the seal member 26.

The foregoing first to fifth embodiments describe the case where two liquid crystal display panels are connected with each other. However, the present invention is not limited thereto. The liquid crystal display apparatus, wherein at least two liquid crystal display panels are connected with each other, falls within the scope of the present invention.

[Sixth Embodiment]

Figure 11:
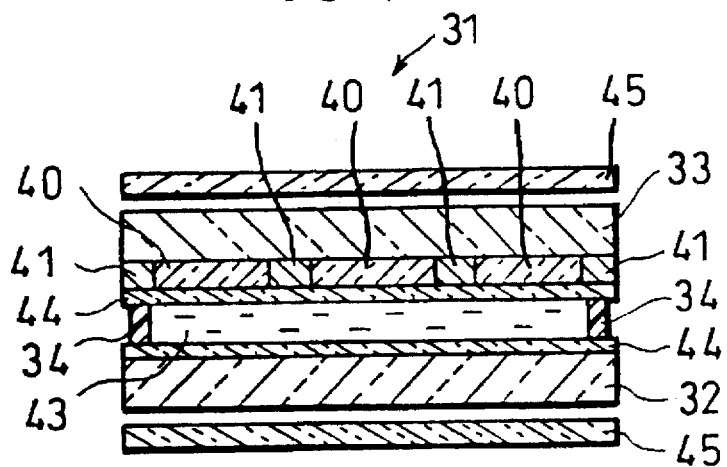
FIG. 11 is a sectional view showing the schematic structure of a liquid crystal display panel of another embodiment in accordance with the present invention.
Figure 12:
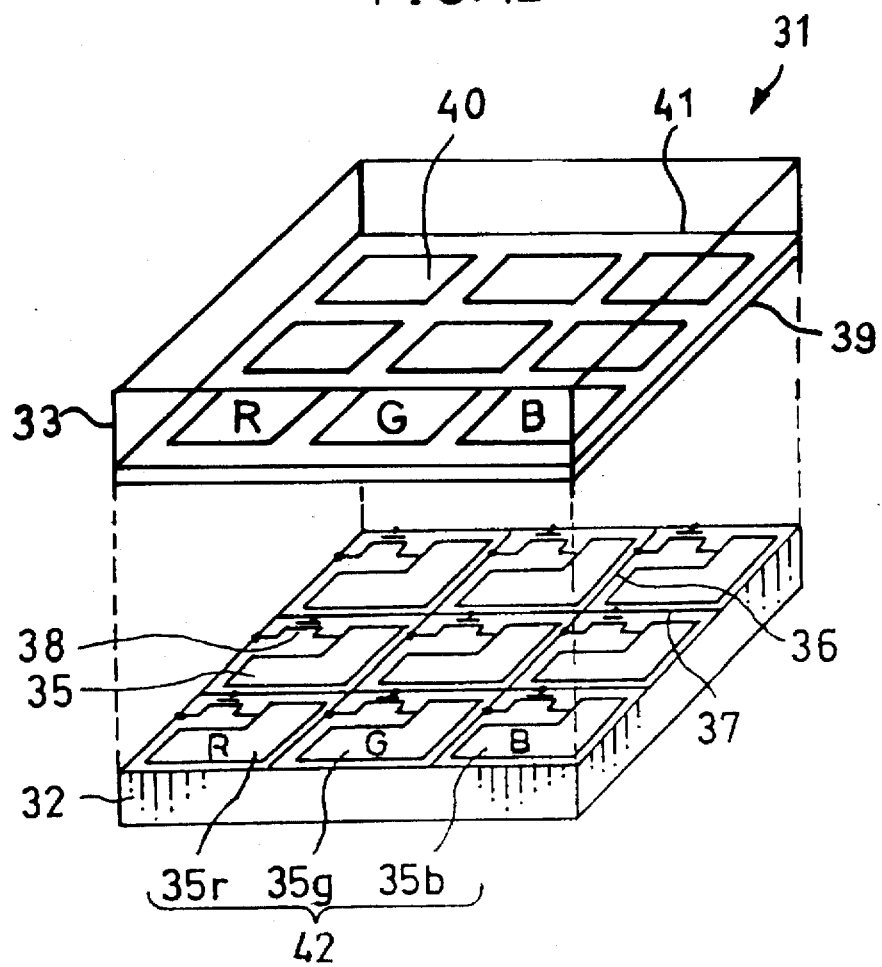
FIG. 12 is an explanatory diagram showing the schematic structure of the liquid crystal display panel.
Figure 13:
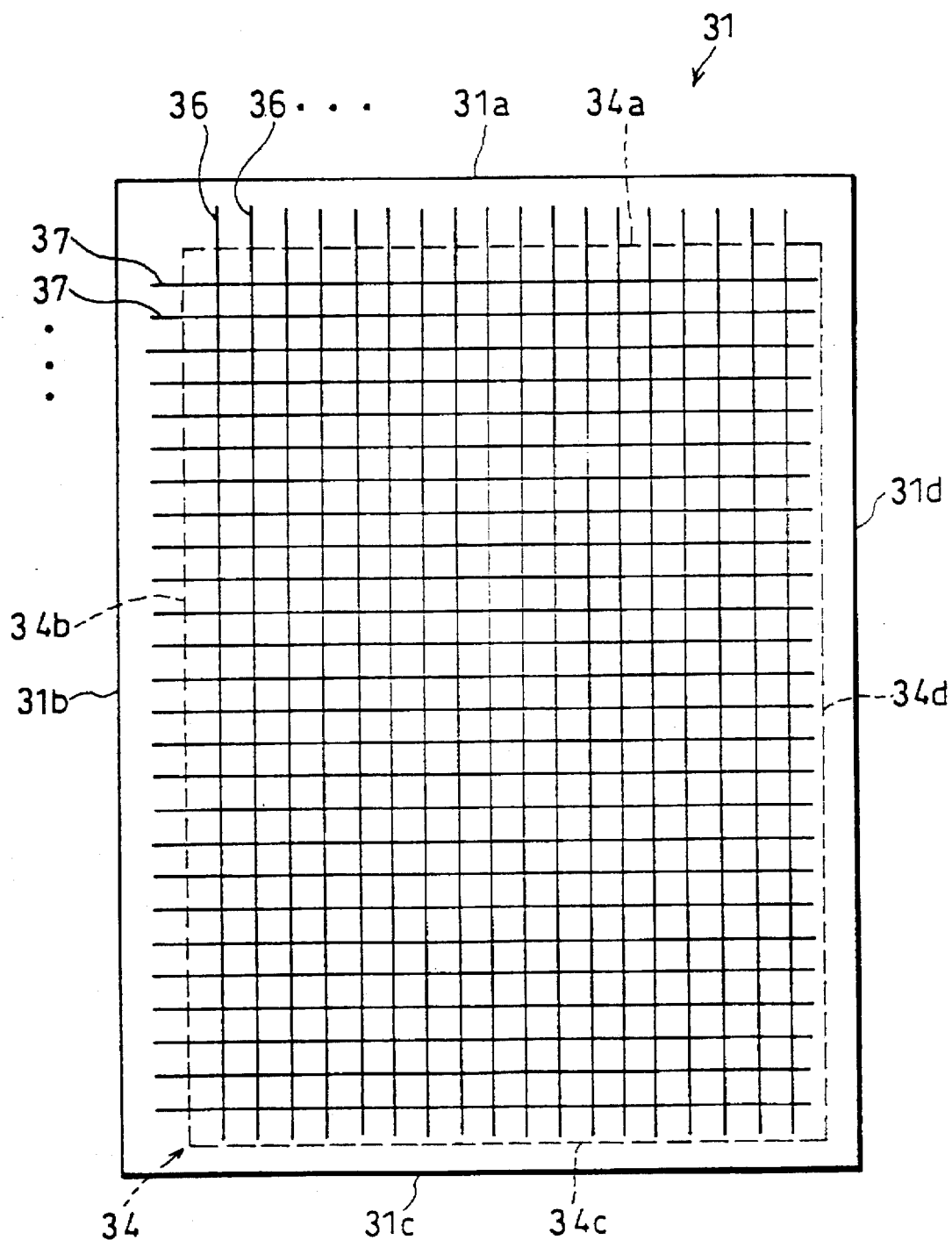
FIG. 13 is an explanatory diagram showing how the pattern of the electric wiring relates to the pattern of the seal member in the liquid crystal display panel.

The following description describes another embodiment of the present invention with reference to FIGS. 11 through 13.

The foregoing first to fifth embodiments describe the liquid crystal display apparatus having so-called hybrid type or multi-panel type structure wherein a plurality of liquid crystal display panels are connected with each other so as to realize a large scope display. In contrast, the liquid crystal display panel of the present embodiment is used for a liquid crystal display apparatus having a single liquid crystal display panel.

FIG. 11 is a sectional view showing the schematic structure of a liquid crystal display panel 31 in accordance with the present embodiment, and FIG. 12 is an explanatory diagram showing the schematic structure of the liquid crystal display panel 31. The liquid crystal display panel 31 has substantially the same structure as that of each liquid crystal display panel for use in the foregoing connecting type liquid crystal display apparatus.

The liquid crystal display panel 31 is arranged (1) so that a seal member 34 combines a TFT substrate 32 made of a transparent insulation substrate with an opposite substrate 33 opposite to the TFT substrate 32 and (2) so that the liquid crystal is filled into between the TFT substrate 32 and the opposite substrate 33 to form a liquid crystal layer 43. Namely, the liquid crystal display panel 31 is arranged so that the liquid crystal layer 43 is sandwiched by the TFT substrate 32 and the opposite substrate 33.

There are provided on the TFT substrate 32 (1) pixel electrodes 35 in a matrix form and (2) signal electrodes 36 (source electrodes) and scanning electrodes 37 (gate electrodes). There is provided a thin film transistor (TFT) 38 around the place where the signal electrode 36 and the scanning electrode 37 cross each other. The pixel electrode 35 is connected with the TFT 38.

There is provided a common electrode 39 on the opposite substrate 33. There are also provided, on the opposite substrate 33, (1) respective R (red), G (green) and B (blue) color filters 40 which correspond to the respective pixel electrodes 35 and (2) a black matrix 41 for separating each pixel part. The black matrix 41 is provided for blocking the light so that the light is prevented from being guided to the space between the pixel electrodes 35 or to an area where the TFT 38 is provided.

Each of the TFT substrate 32 and the opposite substrate 33 is provided, on the surface contacting the liquid crystal layer 43 on each opposite surface side, with an orientation film 44 for orientating the liquid crystal molecules in a predetermined direction. The surfaces, on the opposite side of the surfaces on which the orientation films 44 are provided, are provided with respective polarization plates 45.

Each pixel electrode 35 corresponds to R (red), G (green), and B (blue) color filters 40 for the color display. The R color filter is a pixel electrode 35r for displaying the red color, the G color filter is a pixel electrode 35g for displaying the green color, the B color filter is a pixel electrode 35b for displaying the blue color. A single pixel 42 is composed of these three pixel electrodes 35r, 35g and 35b.

The pixel 42 is driven by the TFT 38 connected to each pixel electrode 35. More specifically, each gate of the TFTs 38 is connected to the scanning electrode 37, and each pixel electrode 35 is connected to the signal electrode 36 through the drain and source of the TFT 38. With the connection, each TFT 38 controls the supplying of the picture image signal to the pixel electrode 35 so as to independently drive each pixel electrode 35.

For the liquid crystal display apparatus having the foregoing liquid crystal display panel 31, the light transmission of the liquid crystal varies depending on the picture image signal which is supplied to each pixel electrode 35. The color picture image is diplayed by modulating to transmit the incident light.

FIG. 13 is an explanatory diagram showing how the pattern of the electric wiring for forming the signal electrodes 36 and the scanning electrodes 37 of the liquid crystal display panel 31 relates to the pattern for applying the seal member 34. Note that an opening through which the liquid crystal is filled is omitted in the seal pattern of FIG. 13.

In the liquid crystal display panel 31, from two sides 31a and 31b among surrounding four sides 31a to 31d, the electrode terminals, of the respective signal electrodes 36 and the scanning electrodes 37 which are both electric wirings, are drawn. The liquid crystal display panel 31 has the structure wherein the terminals are drawn from one side, i.e., has a so-called one side terminal drawing structure.

The seal member 34 is applied to at least one of the substrates 32 and 33 which constitutes the liquid crystal display panel 31. After the substrates 32 and 33 are combined through the seal member 34, the liquid crystal is filled between the substrates 32 and 33 through the opening so as to form the liquid crystal layer 43.

The seal member 34 is applied to the four sides 31a to 31d of the liquid crystal display panel 31 so as to form seal members 34a to 34d (see FIG. 13). In the two sides 31a and 31b from which the electrode terminals of the respective signal electrodes 36 and the scanning electrodes 37 are drawn, the signal electrodes 36 and the scanning electrodes 37 are extended toward outside so as to cross the seal members 34a and 34b.

However, in a side 31c of the liquid crystal display panel 31, the signal electrodes 36 are formed so as not to cross the seal member 34c. As shown in FIG. 13, the signal electrodes 36 are interrupted by the seal member 34c so as not to cross the seal member 34c. Similarly, in a side 31d of the liquid crystal display panel 31, the scanning electrodes 37 are formed so as not to cross the seal member 34d. The scanning electrodes 37 are interrupted by the seal member 34d so as not to cross the seal member 34d.

With the arrangement, there is no step part which is formed by the substrate and the signal electrodes 36 in the area on the substrate on which the seal member 34c is applied. Accordingly, it can be eliminated that the seal member 34c is seeped out due to the step, thereby enabling to make a seal pattern which is excellent in the linearity.

Even in the case where the cell is made by combining the substrates 32 and 33, since no variation of the cell thicknesses exsists in the area where the seal member 34c exsists, the seal member 34c is uniformly expanded, thereby enabling to provide the seal member 34c with accuracy.

Similarly, there is no step part which is formed by the substrate and the scanning electrodes 37 in the area on the substrate on which the seal member 34d is applied. Accordingly, it can be eliminated that the seal member 34d is seeped out due to the step, thereby enabling to make a seal pattern which is excellent in the linearity. Even in the case where the cell is made by combining the substrates 32 and 33, since no variation of the cell thicknesses exsists in the area where the seal member 34d exsists, the seal member 34d is uniformly expanded, thereby enabling to provide the seal member 34d with accuracy.

Since (1) it is suppressed that the seal members 34c and 34d are seeped out and the seal pattern is disturbed and (2) it is avoided that the seal members 34c and 34d erode the pixel 42 area, it is possible to provide the seal members 34c and 34d in the vicinity of the pixel 42. Accordingly, it is possible to enlarge the pixel 42 area of the liquid crystal display panel 31 (i.e., the display area) up to around the area where the seal members 34c and 34d are provided. Thus, it is possible to enlarge the display area of the liquid crystal display panel 31 in two directions (in a plane manner), i.e., in a direction of the seal member 34c and in a direction of the seal member 34d.

Like the foregoing fifth embodiment, when a seal guide line (an island) of protrusion as the step part is provided so that a step is formed with respect to the TFT substrate 32 in the area where the seal members 34c and 34d are applied to the TFT substrate 32, it is possible to provide the seal members 34c and 34d in the vicinity of the pixel 42 with much accuracy.

The liquid crystal display panel 31 of the present embodiment is arranged so that the electric wiring does not cross the seal member in the two sides among the surrounding four sides. The present invention is not limited thereto. Namely, the foregoing effects are obtainable provided that the liquid crystal display panel 31 is arranged so that the electric wiring does not cross the seal member in at least one side among the four sides.

In addition, it is required to have the arrangement of the liquid crystal display panel wherein the electric wiring does not cross the seal member in at least one side among the four sides, the arrangement other than such an arrangement is not limited to that of described in the foregoing embodiment. The present liquid crystal display panel is widely adaptable to a variety of liquid crystal display panels including an ordinary active matrix type liquid crystal display panel.

There are described above novel features which the skilled man will appreciate give rise to advantages. These are each independent aspects of the invention to be covered by the present application, irrespective of whether or not they are included within the scope of the following claims.

What is claimed is:

1. A liquid crystal display panel comprising:
   a pair of substrates;
   an electric wiring provided at least on one of said substrates; and a seal member, applied to said substrate so as to partially cross said electric wiring, for combining said pair of substrates so that a liquid crystal is filled between said pair of substrates, said seal member being made of a ultraviolet ray hardening resin or a ultraviolet ray hardening resin used in combination with heat hardening, wherein said electric wiring has a line width of narrower in an area where said seal member crosses said electric wiring than in an area where said seal member does not cross said electric wiring.

2. The liquid crystal display panel as set forth in claim 1, wherein said electric wiring is provided so as to have a line width of 1 to 5 microns in the area where said seal member crosses said electric wiring.

3. A liquid crystal display apparatus comprising:

a plurality of liquid crystal display panels provided in a same plane, said neighbouring liquid crystal display panels being connected with each other so as to have a single display scope, said each liquid crystal display panel including:
a pair of substrates;
an electric wiring provided at least on one of said substrates; and
a seal member, applied to said substrate so as to partially cross said electric wiring, for combining said pair of substrates so that a liquid crystal is filled between said pair of substrates, said seal member being made of a ultraviolet ray hardening resin or a ultraviolet ray hardening resin used in combination with heat hardening, wherein said electric wiring has a line width of narrower in an area where said seal member crosses said electric wiring than in an area where said seal member does not cross said electric wiring.

4. The liquid crystal display apparatus as set forth in claim 3, wherein said electric wiring is provided so as to have a line width of 1 to 5 microns in the area where said seal member crosses said electric wiring.

5. The liquid crystal display apparatus as set forth in claim 3, further comprising a refractive index adjustment member provided in a connecting part between said plurality of liquid crystal display panels, wherein said refractive index adjustment member is made of a material whose refractive index is substantially the same as those of said pair of substrates of each liquid crystal display panel.

6. The liquid crystal display apparatus as set forth in claim 5, wherein said refractive index adjustment member is used as an adhesive agent which combines said plurality of liquid crystal display panels with each other on a transparent substrate whose refractive index is substantially the same as that of said refractive index adjustment member.

7. The liquid crystal display apparatus as set forth in claim 6, wherein said plurality of liquid crystal display panels and said transparent substrate are sandwiched between two polarization plates whose polarization axes are orthogonal to each other.

8. The liquid crystal display apparatus as set forth in claim 3, wherein one of said pair of substrates is provided with:

a plurality of pixel electrodes provided in a matrix manner;

a plurality of signal electrodes and scanning electrodes, provided as the electric wiring, for supplying a picture image signal to said pixel electrode; and a plurality of switching devices, connected to said respective pixel electrodes, for controlling the supplying of the picture image signal to said pixel electrode, the other one of said pair of substrates being provided with:

a black matrix for preventing light from being guided to a space between said pixel electrodes or to said switching device;

a color filter, provided for each pixel electrode, wherein red, green, and blue filters are respectively disposed in accordance with a predetermined pattern; and a common electrode through which a voltage is applied to the liquid crystal.

9. The liquid crystal display apparatus as set forth in claim 3, wherein the number of liquid crystal display panels are two.

* * * * *